United States Patent [19]
Aoki et al.

[11] Patent Number: 5,809,944
[45] Date of Patent: Sep. 22, 1998

[54] COOLING WATER CONTROL VALVE AND COOLING WATER CIRCUIT SYSTEM EMPLOYING THE SAME

[75] Inventors: Shinji Aoki, Kariya; Toshio Morikawa, Toyota; Yoshimitsu Inoue, Chiryu, all of Japan

[73] Assignee: Denso Corporation, Kariya, Japan

[21] Appl. No.: 924,441

[22] Filed: Aug. 26, 1997

[30] Foreign Application Priority Data

Aug. 30, 1996 [JP] Japan .................................. 8-230941

[51] Int. Cl.⁶ .................................................. F01P 7/00
[52] U.S. Cl. ................................ 123/41.02; 123/41.09
[58] Field of Search .......................... 123/41.01, 41.02, 123/41.05, 41.08, 41.09

[56] References Cited

U.S. PATENT DOCUMENTS

| | | | |
|---|---|---|---|
| 3,921,600 | 11/1975 | Henning et al. | 123/41.02 |
| 4,509,481 | 4/1985 | Nagumo et al. | 123/41.02 |
| 4,545,333 | 10/1985 | Nagumo et al. | 123/41.02 |
| 4,930,455 | 6/1990 | Creed et al. | 123/41.02 |
| 4,977,743 | 12/1990 | Aihara et al. | 123/41.31 |
| 5,404,842 | 4/1995 | Matsushiro et al. | 123/41.1 |
| 5,642,691 | 7/1997 | Schroeder | 123/41.09 |

FOREIGN PATENT DOCUMENTS

| | | |
|---|---|---|
| 7-083052 | 3/1995 | Japan . |
| 8-183324 | 7/1996 | Japan . |

*Primary Examiner*—David A. Okonsky
*Attorney, Agent, or Firm*—Harness, Dickey & Pierce, PLC

[57] ABSTRACT

According to the present invention, in a cooling water control valve disposed in a cooling water circuit of a water-cooled engine, switching of the cooling water flowing into and out of a heat-accumulating tank and control of an amount of the cooling water passing through a bypass water passage are performed by a single control valve element. Further, a bypass water passage is opened according to a decrease of an absolute of intake negative pressure detected by a pressure sensor and is closed according to the increase of the absolute of the intake negative pressure.

17 Claims, 26 Drawing Sheets

COOLING WATER CONTROL VALVE AND COOLING WATER CIRCUIT SYSTEM EMPLOYING THE SAME

CROSS REFERENCE TO THE RELATED APPLICATION

This application is based on and claims priority of Japanese Patent Application No. Hei. 8-230941 filed on Aug. 30, 1996, the content of which are incorporated herein by reference.

BACKGROUND OF THE INVENTION

1. Field of the Invention

The present invention relates to a cooling water circuit system of a water-cooled engine (hereinafter referred to as "engine").

Conventionally, the cooling water circuit of the engine includes, as being known well, a radiator water passage through which the cooling water circulates between the engine and a radiator, and a thermostat for opening and closing the radiator water passage in accordance with a temperature of the cooling water. The thermostat opens and closes the radiator water passage to maintain the temperature of the cooling water approximately at 80° C.

Further, because the cooling water passing through a bypass water passage is introduced to a temperature sensing portion of the thermostat, when the thermostat is closed, a thermo-wax stretches and shrinks in accordance with the temperature of the cooling water, and when the thermostat is opened, the thermo-wax stretches and shrinks in accordance with the temperature of the cooling water passing through the radiator water passage and the bypass water passage to operate the thermostat.

2. Description of Related Art

The inventors of the present invention has studied a relationship between the temperature of the cooling water and the engine load to improve the fuel consumption, with the result that it turned out that, when the engine load is small, it is more advantageous that the temperature of the cooling water is maintained high rather than evenly maintained at a constant value (e.g., 80° C.) to improve the fuel consumption, as compared with when the engine load is large.

The inventors have experimentally produced a cooling water circuit for controlling the temperature of the cooling water in accordance with the engine load, in which a flow control valve for adjusting a flow amount in accordance with the engine load is disposed.

However, because the flow control valve of the cooling water circuit is of a mechanical type in which engine negative pressure is introduced into a pressure chamber formed by a diaphragm to directly actuate a valve element of the flow control valve by the displacement of the diaphragm, the flow control valve, especially the diaphragm, is large-sized, with the result that there occurs a problem in that it is difficult to mount (assemble) the cooling water circuit on the vehicle.

To further improve the fuel consumption, high-temperature cooling water accumulated in a heat-accumulating tank may be introduced to the engine to accelerate a warming-up operation. Therefore, the inventors further experimentally produced a cooling water circuit in which a switching valve for controlling the cooling water flowing out of a heat-accumulating tank is disposed in addition to the flow control valve. As a result, the entire cooling water circuit is further large-sized and complicated, and it becomes more difficult to mount the cooling water circuit on the vehicle.

SUMMARY OF THE INVENTION

In light of the above-described problems, the present invention has an object of providing a cooling water control valve in which a flow control valve mechanism and a switching valve mechanism are integrated to improve the mounting performance of the cooling water circuit on the vehicle and further to improve the fuel consumption.

According to the present invention, an amount of cooling water passing through a temperature sensing water passage for introducing the cooling water discharged from an engine and flowing into a housing to a temperature sensing portion of the temperature sensing operation valve and a flow of the cooling water flowing into and out of a heat-accumulating tank are controlled by a single control valve element. Further, the amount of the cooling water passing through the temperature sensing water passage is increased according to a decrease of an absolute valve of intake negative pressure. On the other hand, the amount of the cooling water passing through the temperature sensing water passage is decreased according to a increase of an absolute valve of intake negative pressure.

In this way, the flow control mechanism and the switching valve mechanism can be performed by the single control valve. Therefore, as compared with when the flow control mechanism and the switching valve mechanism are performed by independent valve means, the number of the parts can be reduced. Accordingly, it is possible to downsize the cooling water circuit for improving the fuel consumption and to improve the mounting (assembling) performance on the vehicle.

In addition, When the intake negative pressure corresponding to load of the water-cooled engine is decreased, the amount of the cooling water passing through the temperature sensing water passage is increased, so that the temperature sensing operation valve operates quickly. On the other hand, when the intake negative pressure is increased, the amount of the cooling water passing through the temperature sensing water passage is decreased, so that the temperature sensing operation valve operates slowly. In this way, when the load of the engine is small, the temperature of the cooling water can be maintained high as compared with when the load of the engine is large. Therefore, it is possible to improve the fuel consumption.

Further, the temperature sensing water passage may be closed during a warming-up operation of the engine.

In this way, as being different from the apparatus in which the amount of the cooling water passing through the bypass water passage is mechanically controlled by the intake negative pressure when the load applied to the engine is increased during the warming-up operation of the engine (the absolute value of the intake negative pressure is decreased), it is possible to prevent a large amount of the low-temperature cooling water discharged out of the engine 1 from passing through the bypass water passage 101 and further circulating into the engine. Therefore, since it is possible to further accelerate the warming-up operation of the engine, the fuel consumption can be further improved.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Embodiments according to the present invention are hereinafter described with reference to the accompanying drawings.

A first embodiment of the present invention will be described.

Figure 1:
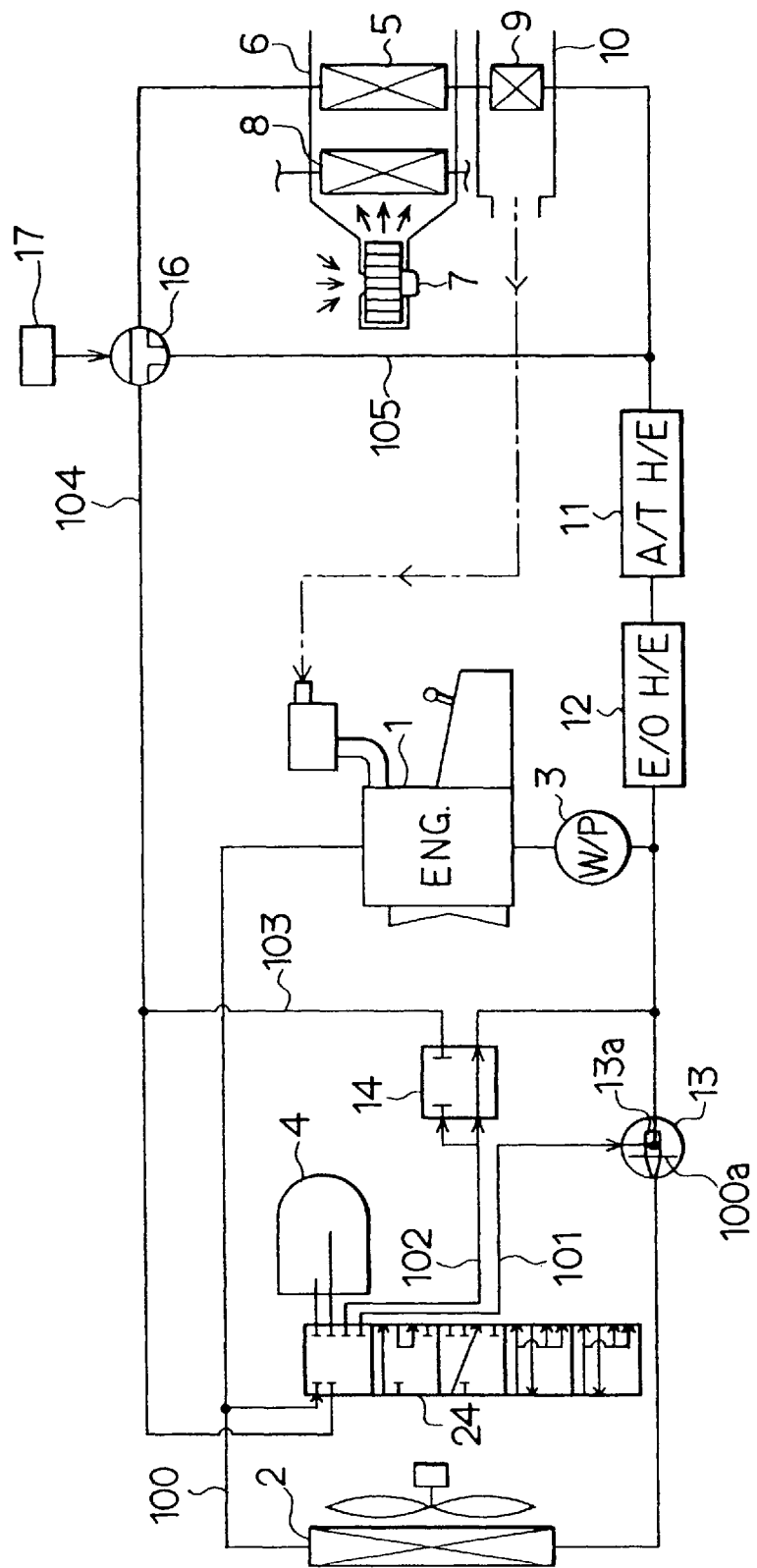
FIG. 1 shows a flow of cooling water in a cooling water circuit in a cooling water temperature maintaining mode according to a first embodiment of the present invention.

FIG. 1 shows a cooling water circuit of a water-cooled internal combustion engine (hereinafter referred to as "engine") for a vehicle and a cooling water circuit of an air conditioning apparatus, for heating a passenger compartment of the vehicle by using the cooling water of the engine 1 as heat source. A radiator 2 is for cooling the cooling water having flowed out of the engine 1, and a water pump 3 is for sucking the cooling water having flowed out of the engine 1 and pumping the cooling water toward the engine 1 while receiving a driving force from the engine 1.

A heat-accumulating tank 4 has a double tank structure. A heater core 5 is for heating air by using the cooling water as heat source, and is disposed in an air conditioning casing 6 forming an air passage for blowing air into the passenger compartment. A blower 7 is disposed at an upstream side of the air conditioning casing 6. An evaporator 8 is disposed between the blower 7 and the heater core 5 to cool air flowing therethrough. In this embodiment, there is employed an air conditioning apparatus (so-called re-heat type) in which a temperature of air to be blown into the passenger compartment is adjusted by an amount of the cooling water flowing in the heater core 5, an amount of blown-air, and the like.

An intake air heat exchanger 9 is for performing heat-exchange between air to be sucked into the engine 1 and the cooling water. The intake air heat exchanger 9 is disposed in a surge tank 10 for removing a pulsation of intake air. An A/T heat exchanger (oil heat exchanger) 11 is for performing heat-exchange between the cooling water having flowed out of the engine and mission oil of an automatic transmission for a vehicle. An E/O heat exchanger 12 is for performing heat-exchange between the cooling water having flowed out of the engine and the engine oil.

The cooling water having flowed out of the engine 1 circulates in a radiator water passage while passing through the radiator 2 to the engine 1. The cooling water having flowed out of the engine 1 circulates in a bypass water passage (temperature sensing water passage) while bypassing the radiator to the engine 1. The bypass water passage 101 joins to the radiator water passage 100 at an outlet side of the is radiator 2. At the joining portion 100a, there is provided a thermostat (temperature sensing operation valve) for opening and closing a valve element thereof in accordance with the temperature of the cooling water.

The bypass water passage 101 is connected to the joining portion 100a to introduce the cooling water having passed through the bypass passage 101 to a temperature sensing portion (a wax box in which thermo-wax material is filled) 13a of the thermostat 13. Because the valve body portion is disposed at the side of the radiator 2 than the joining portion 100a to open and close the radiator water passage 100, even while the thermostat 13 is closed, the bypass water passage 101 can be communicated.

While passing through a heater water passage 104, the cooling water having flowed out of the heat-accumulating tank 4 circulates into the engine 1 through the heater core 5, the intake air heat exchanger 9, the A/T heat exchanger 11, the E/O heat exchanger 12. A heater bypass water passage 105 is for introducing the cooling water having flowed out of the heat-accumulating tank 4 into an inflow side of the A/T heat exchanger 11 to bypass the heater core 5 and the intake air heat exchanger 9. At a branch portion between the H/O heat exchanger water passage 104 and the heater bypass water passage 105, there is disposed a flow control valve 16 for controlling an amount of the cooling water flowing into the heater core 5.

Figure 2:
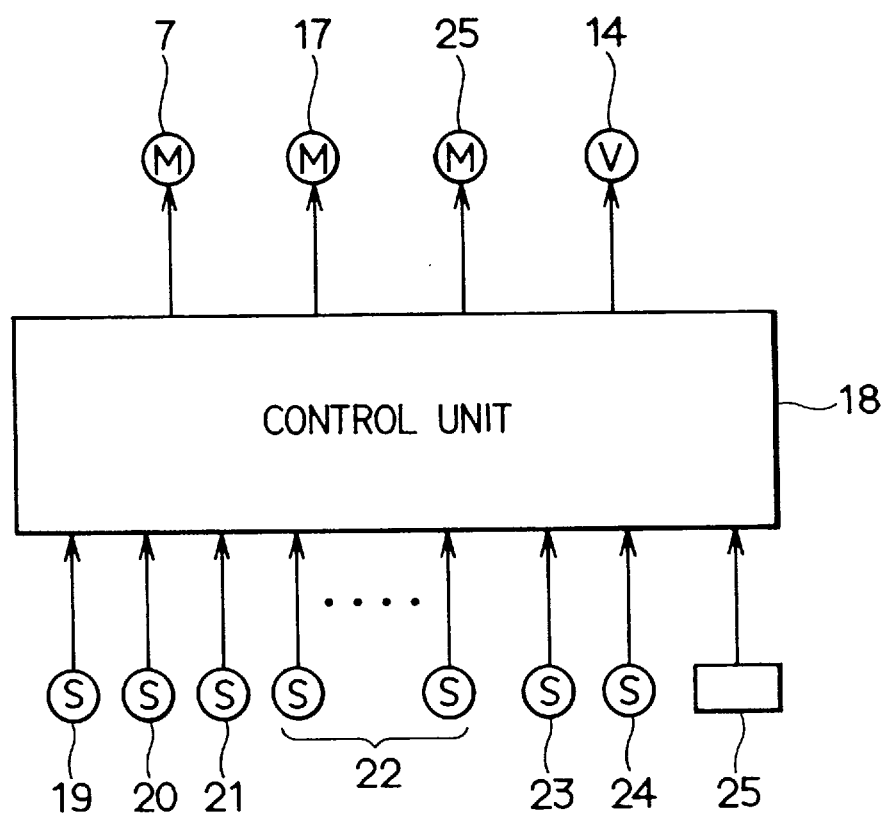
FIG. 2 is a block diagram of a control system in the first embodiment.

The flow control valve 16 is actuated by an actuator 17 such as a servomotor. As shown in FIG. 2, the actuator 17 is controlled by a control unit 18. To the control unit 18, there are input signals from a water temperature sensor 19 for detecting a temperature of the cooling water circulating into the engine 1, a water temperature sensor 20 for detecting a temperature of the cooling water flowing into the heater core water passage 104, a water temperature sensor 21 for detecting a temperature of the cooling water having just flowed out of the engine 1 (or a temperature of the cooling water in the engine 1), an air conditioning sensor 22 for detecting information required for controlling the air conditioning apparatus, which includes an outside air temperature for detecting a temperature of the air outside the passenger compartment, an inside air temperature for detecting a temperature of the air in the passenger compartment, and the like, a pressure sensor 23 for electrically detecting an intake negative pressure of the engine 1, and an ignition switch 24 for detecting an operating state of the engine 1.

The control unit 18 controls the actuator 17, the blower 7, and the like according to a program pre-stored based on signals from the water temperature sensor 20 and the air conditioning sensor 22.

Each of the water temperature sensors 19, 20 and 21 is of a thermistor type which is superior in responsibility (time constant thereof is approximately 1–2 sec.).

A quick heating switch 25 is for instructing a heating operation in which high-temperature cooling water in the heat-accumulating tank 4 is introduced into the heater core 5 when the temperature of the cooling water is low, such as at the time of just starting the engine. The quick heating switch 25 is turned on by a manual operation of the passenger.

In FIG. 1, a tank water passage 102 is for introducing the cooling water in the heat-accumulating tank 4, and a quick heating water passage 103 branches from the tank water passage 102 to introduce the cooling water in the heat-accumulating tank 4 into the heater water passage 104. At a branch portion between the tank water passage 102 and the quick heating water passage 103, there is provided a switching valve 14. The switching valve 14 opens the quick heating water passage 103 when the quick heating switch 25 is turned on, and opens the tank water passage 102 and closes the quick heating water passage 103 when the quick heating switch 23 is not turned on.

In FIG. 1, a cooling water control valve 24 is for switching the cooling water passages in accordance with the temperature of the cooling water and an operating condition of the engine 1 and also for adjusting an amount of the cooling water flowing into the bypass passage 101. The cooling water control valve 24 is actuated by an actuator 25 such as a servomotor.

The actuator 25 is also controlled by the control unit 18. The control unit 18 controls the actuator 25 according to a program pre-stored based on signals from the water temperature sensors 19 and 20, the pressure sensor 23, and the ignition switch 24 (see FIG. 2).

Figure 3:
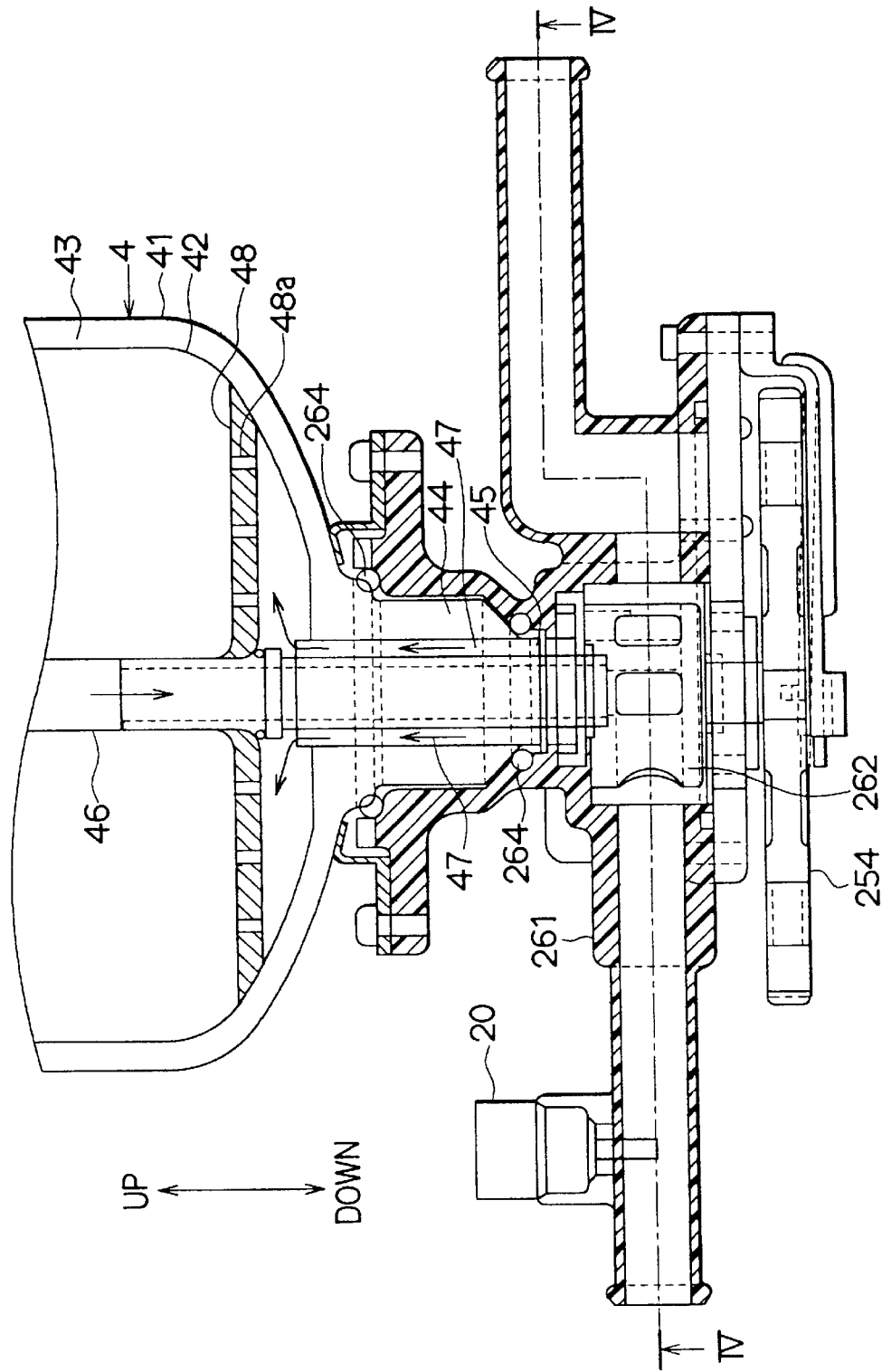
FIG. 3 is a cross sectional view showing a cooling water control valve assembled into a heat-accumulating tank in the first embodiment.

FIG. 3 is a cross sectional view showing the cooling water control valve 24 assembled into the heat-accumulating tank 4. The heat-accumulating tank 4 is, as shown in FIG. 3, constructed by an inside tank 41 and an outside tank 42, each of which is made of a material which is superior in corrosion resistance, such as stainless. Between both tanks 42 and 43, there is formed a heat insulating layer 43 having substantially vacuum to improve heat insulating performance. In FIG. 3, because each thickness of the inside tank 41 and the outside tank 42 is thin, hatching for showing the cross section is omitted.

On a bottom portion of the heat-accumulating tank 4 in the gravitational direction, there is formed a tubular protruding portion 44 protruding in the gravitational direction. In a top end portion of the tubular protruding portion 44, there is formed an opening passage 45 through which the cooling water flows in and out. In the opening passage 45, there is disposed coaxially with the opening passage 45 an inlet pipe 46 having a water inlet (not shown) within the heat-accumulating tank 4 at an upper side in the gravitational direction. A space between the inlet pipe 46 and the opening passage 45 forms an inflow passage 47 for introducing the cooling water having been discharged from the engine 1 into the heat-accumulating tank 4.

A housing 261 of the cooling water control valve 24 is made of resin which is superior in forming performance and heat insulating performance, such as nylon 66. The housing 261 covers entirely the tubular protrusion 44 of the heat-accumulating tank 4 from the outside to prevent heat radiation from the tubular protrusion 44.

Figure 4:
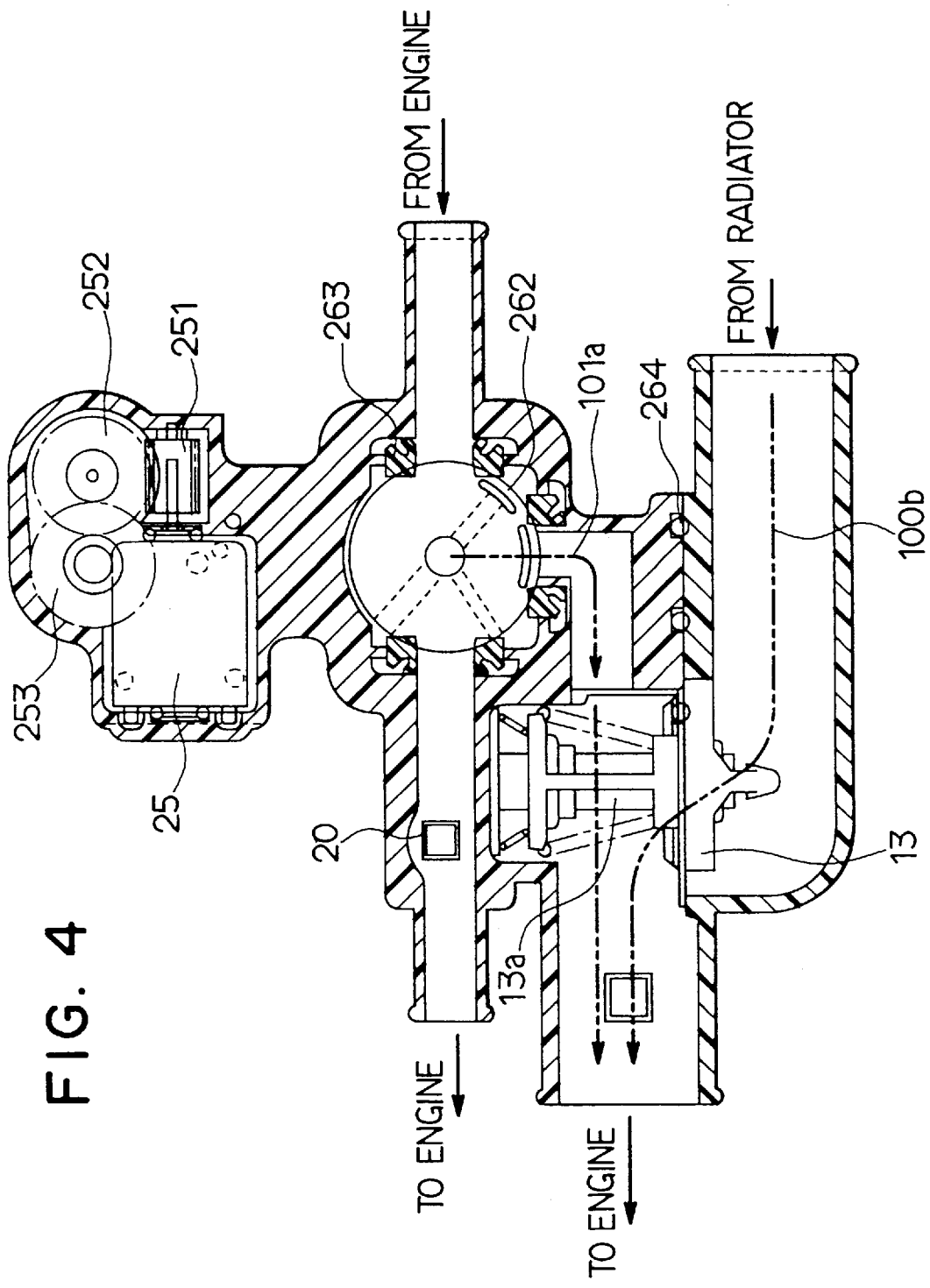
FIG. 4 is a cross sectional view taken along IV—IV of FIG. 3, for showing the cooling water control valve in the cooling water temperature maintaining mode in the first embodiment.

In FIG. 4, one end of a part 100b of the radiator water passage 100 is connected to the cooling water outlet side of the radiator, and the other end thereof is connected to the cooling water inlet side of the engine 1. Further, one end of a part 101a of the bypass water passage 101 is connected to the cooling water outlet side of the engine 1, and the other end thereof is connected to the cooling water inlet side of the engine 1 through the temperature sensing portion 13a.

A control valve element 24 of the cooling water control valve 24 is of the rotary type and is disposed adjacent to the opening passage 45 to selectively open and close the cooling water passage 100b, 106, and 107 and to adjust a flow amount of the bypass passage 101a (101). The control valve element 262 is formed substantially in a column, and is rotatably disposed in such a manner that an axis of the column is consistent with the center of the opening passage 45, as shown in FIG. 4. The control valve element 262 is rotated by a servomotor 25 through a speed reduction mechanism composed of a worm 251, a worm wheel 252, a spur gear 253, and a fan-shaped gear 254.

A sealing member 263 is made of resin fluoride and seals a clearance between the control valve element 262 and the housing 261. An O-ring 264 is made of a nitrile rubber.

A mixture preventing plate 48 is formed in a disc shape in which a plurality of through-holes 48a are formed, and is for preventing a mixture of the cooling water flowing into the heat-accumulating tank 4 and the cooling water staying in the heat-accumulating tank 4.

Next, an operation of the embodiment will be described.

(1) Cooling water heat temperature maintaining mode (while the engine 1 is stopped)

When it is determined that the engine 1 is stopped by a signal from the ignition switch 22, the opening passage 45 is closed. In this way, since the inside and the outside of the heat-accumulating tank 4 is interrupted, the cooling water accumulated in the heat-accumulating tank 4 is reserved (see FIGS. 1 and 4).

Irrespective of the temperature of the cooling water and the ON or OFF state of the quick heating switch 23, when the engine 1 is stopped, the cooling water control valves switches the cooling water circuit to this mode.

(2) Engine warming-up accelerating mode

Figure 5:
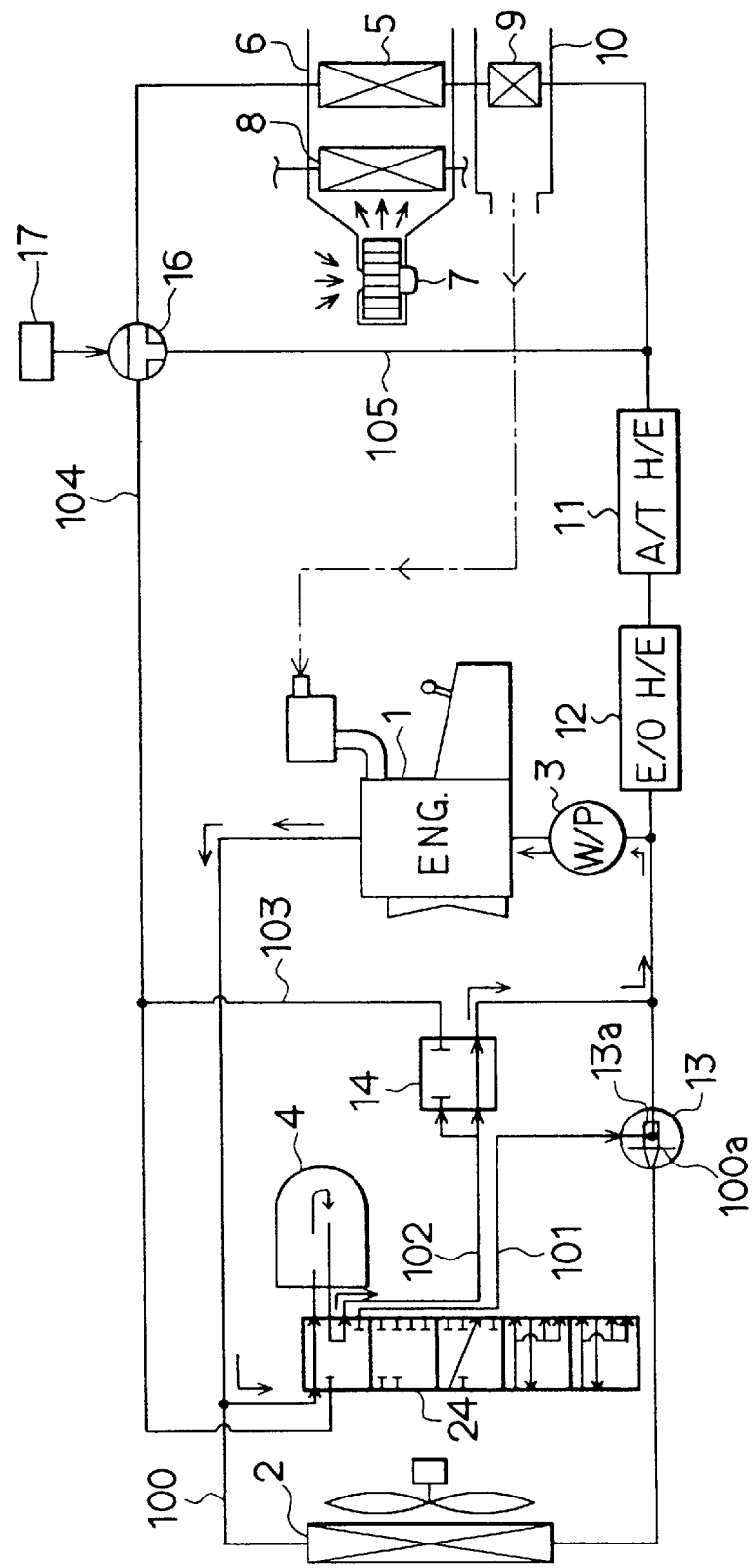
FIG. 5 shows a flow of cooling water in the cooling water circuit in an engine warming-up accelerating mode in the first embodiment.
Figure 6:
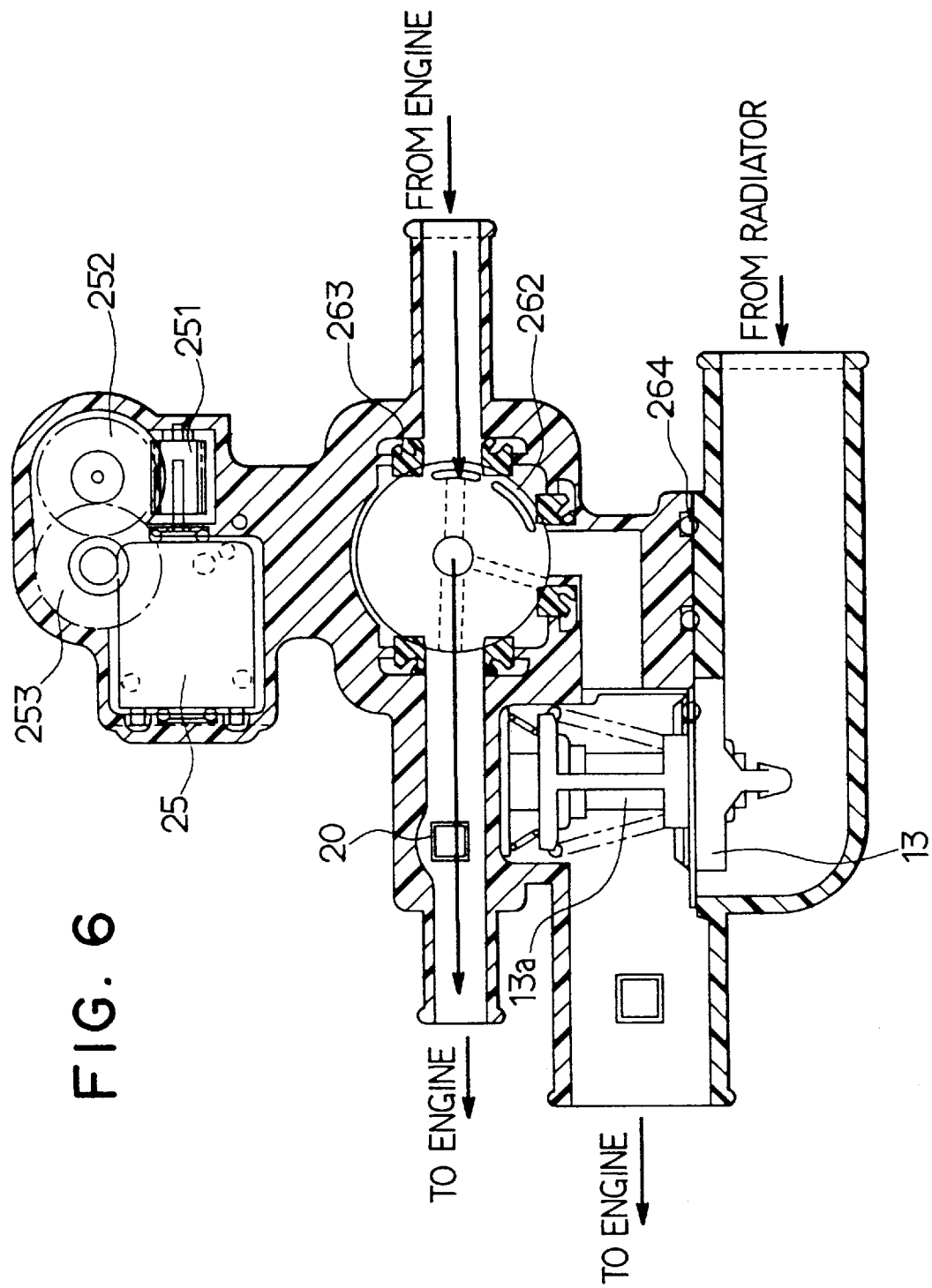
FIG. 6 is a cross sectional view, which corresponds to the cross section taken along IV—IV of FIG. 3, for showing the cooling water control valve in the engine warming-up accelerating mode in the first embodiment.

When the engine 1 starts, the opening passage 45 is opened to introduce the low-temperature cooling water having flowed out of the engine 1 into the heat-accumulating tank 4 and to also introduce the high-temperature cooling water accumulated in the heat-accumulating tank 4 into the engine 1 through the tank water passage 102. In this way, the high-temperature cooling water accumulated in the heat-accumulating tank 4 circulates in the engine 1 to accelerate the warming-up operation of the engine 1 (see FIGS. 5 and 6).

(3) Quick heating mode

Figure 7:
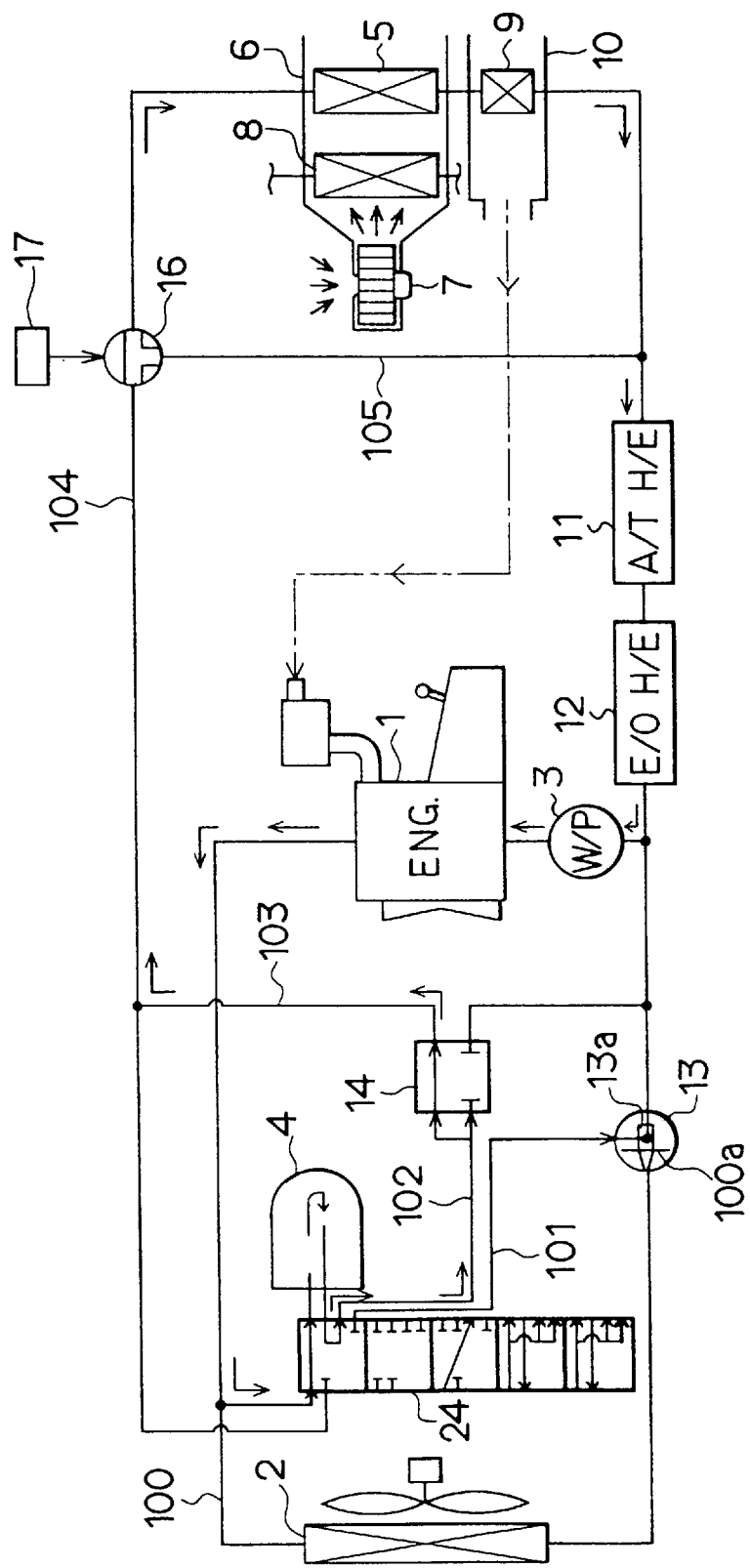
FIG. 7 shows a flow of cooling water in the cooling water circuit in a quick heating mode in the first embodiment.

After the engine 1 starts, when the quick heating switch 23 is turned on, the cooling water control valve 24 is operated to the engine warming-up accelerating mode, and the switching valve 14 closes the tank water passage and opens the quick heating water passage 103. In this way, the cooling water accumulated in the heat-accumulating tank 4 passes toward the heater core 5 to improve the quick heating operation (see FIG. 7).

(4) Cool water reserving mode

Figure 8:
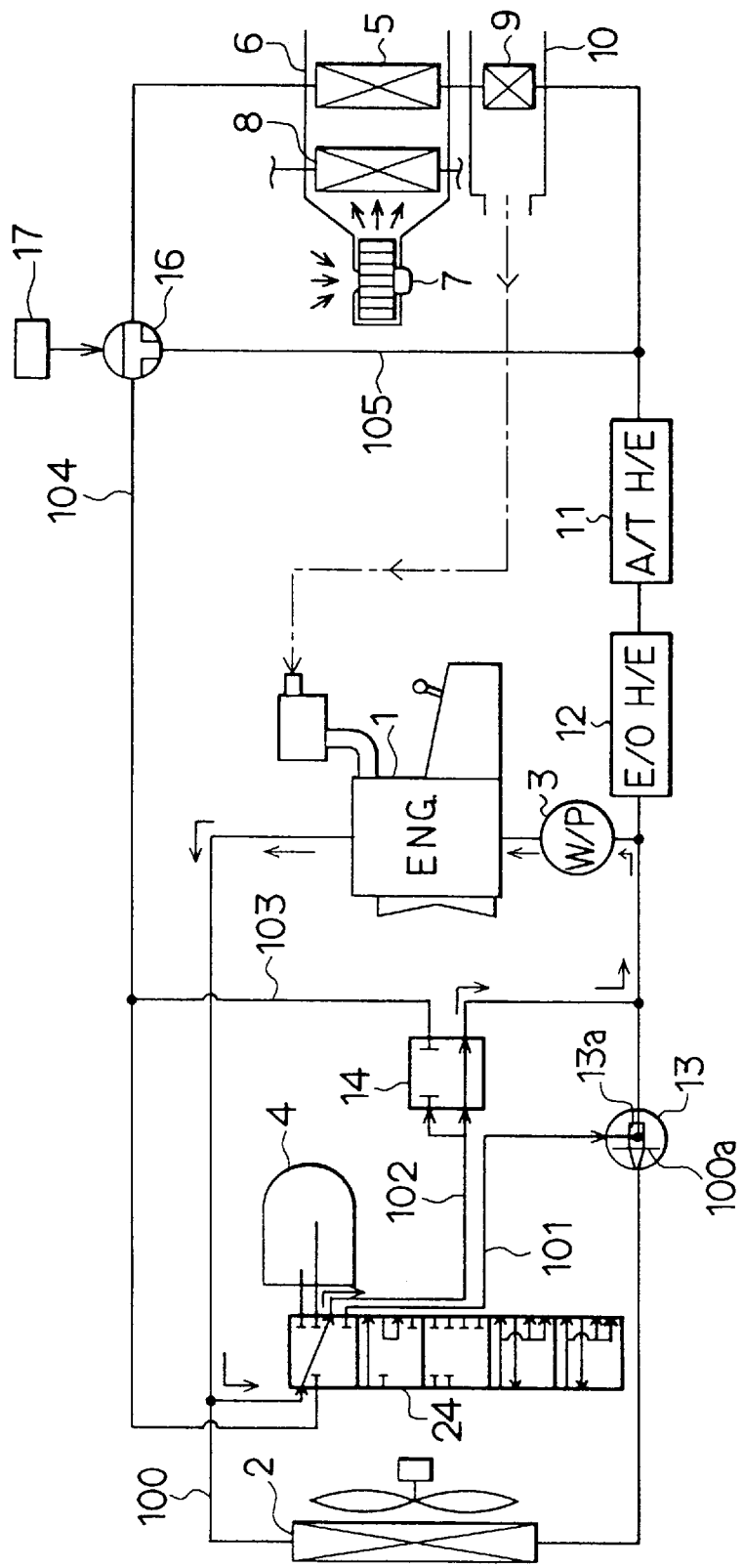
FIG. 8 shows a flow of cooling water in a cooling water circuit in a cool water reserving mode in the first embodiment.
Figure 9:
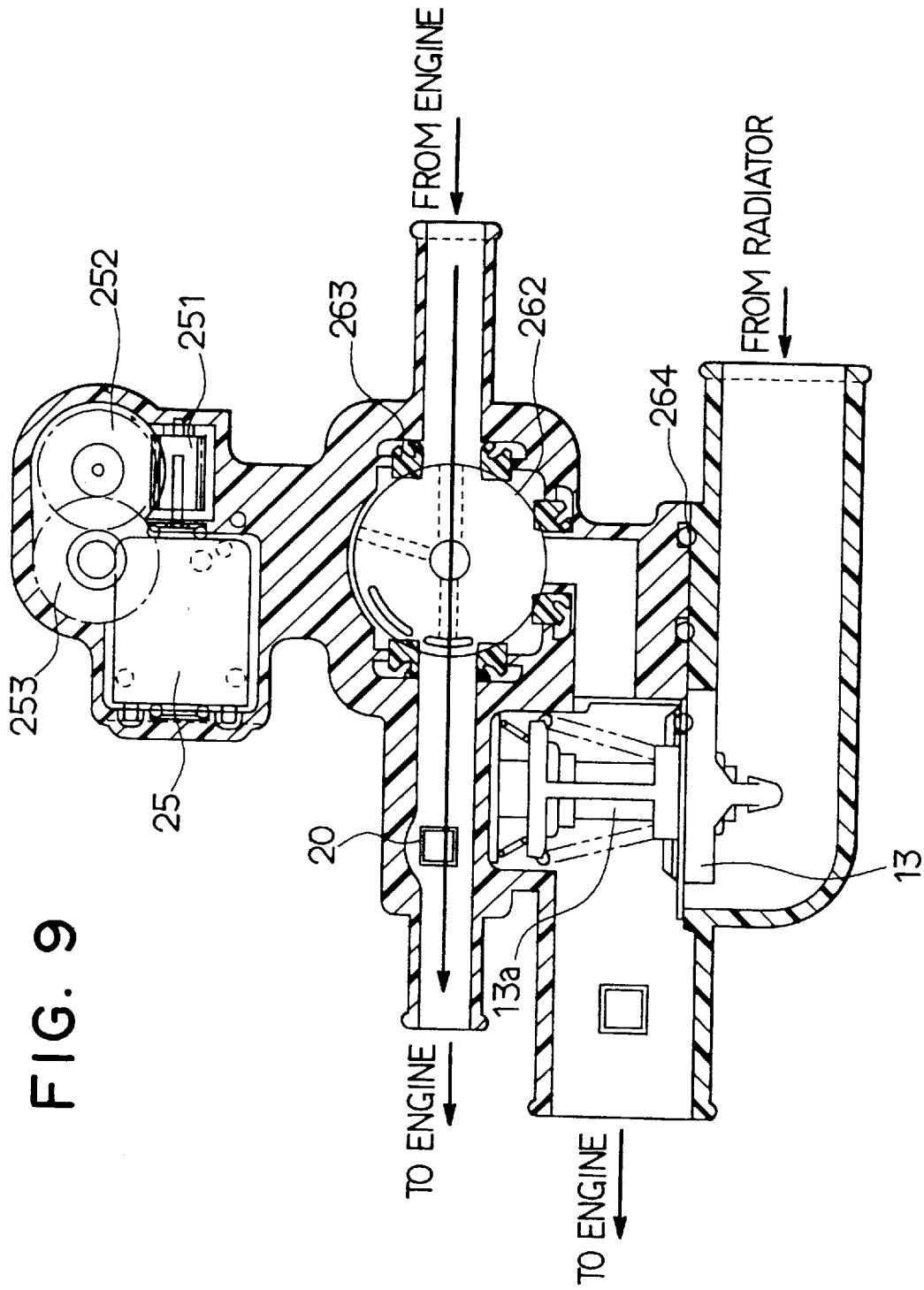
FIG. 9 is a cross sectional view, which corresponds to the cross section taken along IV—IV of FIG. 3, for showing the cooling water control valve in the cool water reserving mode in the first embodiment.

During the engine warming-up accelerating mode, when the temperature $Tw_1$ of the cooling water having flowed out of the heat-accumulating tank 4 (the detection valve of the water temperature sensor 19) is lower than a first predetermined temperature, both of the bypass water passage 101 and the opening passage 45 are closed, so that the cooling water having flowed out of the engine 1 circulates directly into the engine 1 to bypass the heat-accumulating tank 4 (see FIGS. 8 and 9).

The first predetermined is appropriately determined based on the heat insulating capacity of the heat-accumulating tank 4, the minimum outside air temperature and the like. In this embodiment, the first predetermined temperature is set to approximately 30° C.

(5) Heat accumulating mode A

Figure 10:
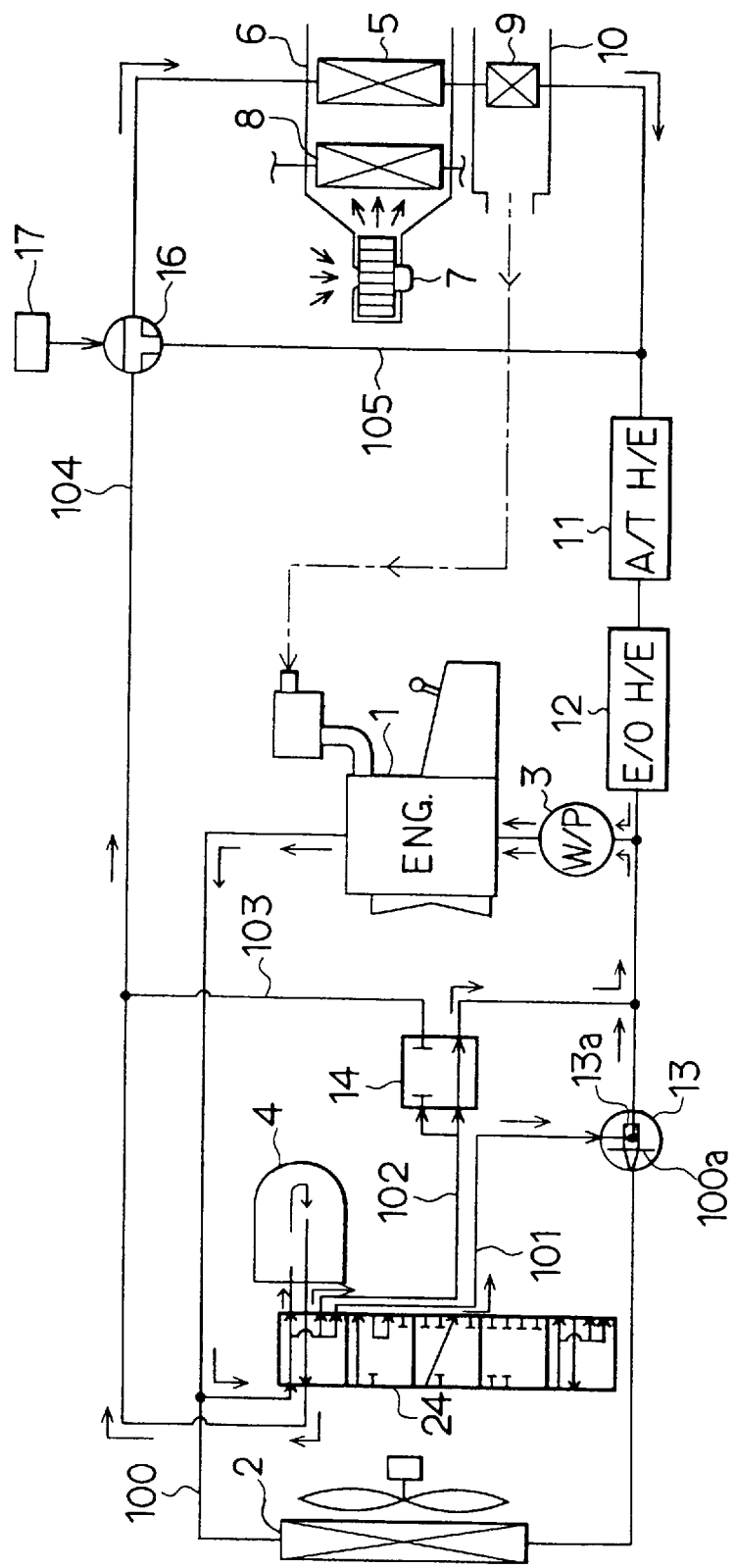
FIG. 10 shows a flow of cooling water in the cooling water circuit in a heat accumulating mode A in the first embodiment.
Figure 11:
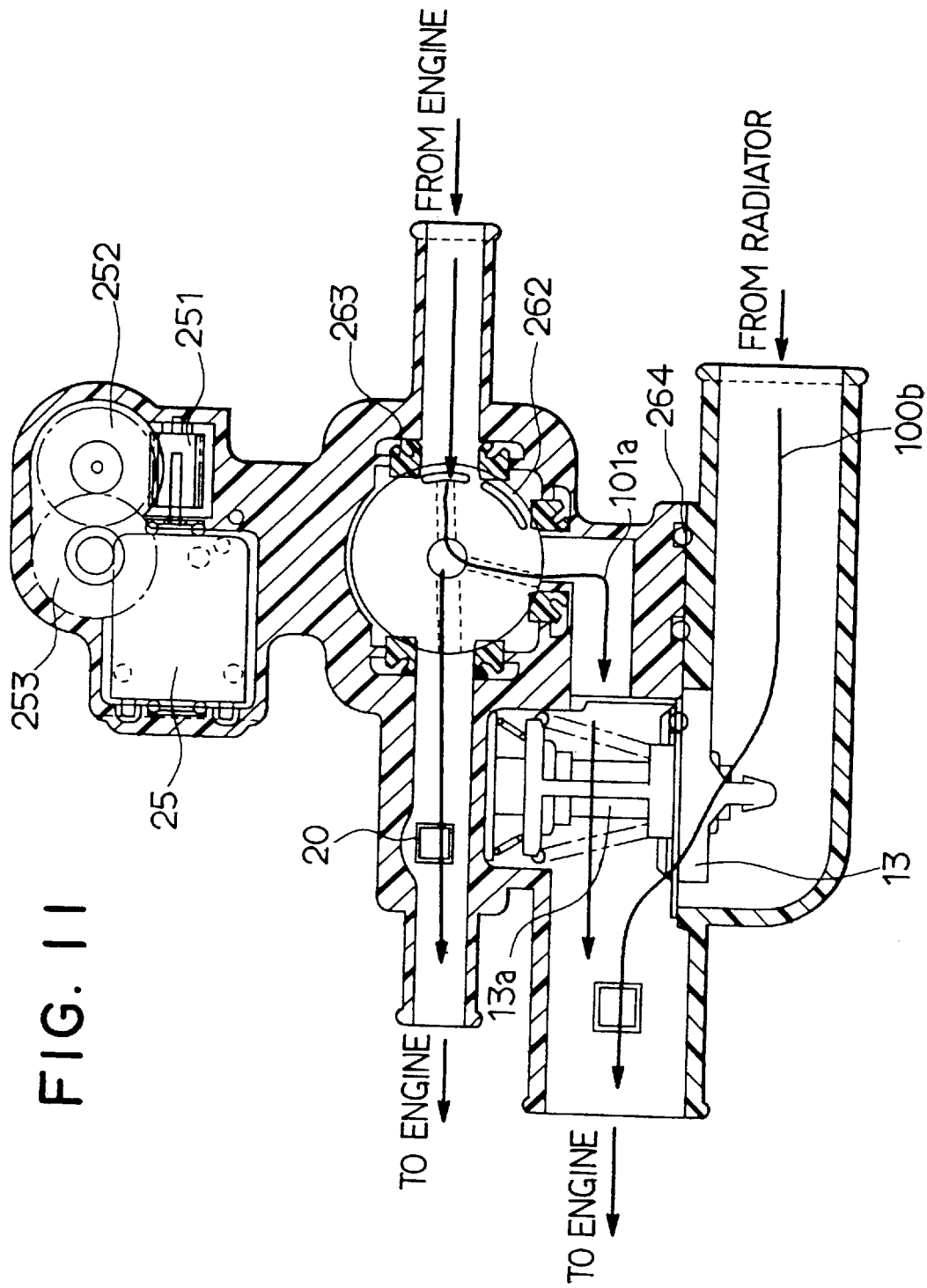
FIG. 11 is a cross sectional view, which corresponds to the cross section taken along IV—IV of FIG. 3, for showing the cooling water control valve in the heat accumulating mode A in the first embodiment.

During the cool water reserving mode, when the temperature $Tw_2$ of the cooling water having flowed out of the heat-accumulating tank 4 (the detection valve of the water temperature sensor 19) reaches a second predetermined temperature (in this embodiment, 80° C.), the heating operation is regarded as finished, and the opening passage 45 is opened. Further, when the absolute value of the intake negative pressure $P_{in}$ of the engine 1 exceeds 35 mmHg, the amount of the cooling water flowing through the bypass water passage 101 is restricted (See FIGS. 10 and 11).

In this way, the cooling water having flowed out of the engine 1 passes through the bypass water passage 101, the heater core 5, and the heat-accumulating tank 4. Therefore, high-temperature cooling water is accumulated in the heat-accumulating tank 4. On the other hand, because a small amount of the cooling water passes through the bypass water passage 101, a temperature sensing operation of the temperature sensing portion 13a of the thermostat 13 becomes slow, and the temperature of the cooling water is maintained approximately at 100° C.

(6) Heat accumulating mode B

Figure 12:
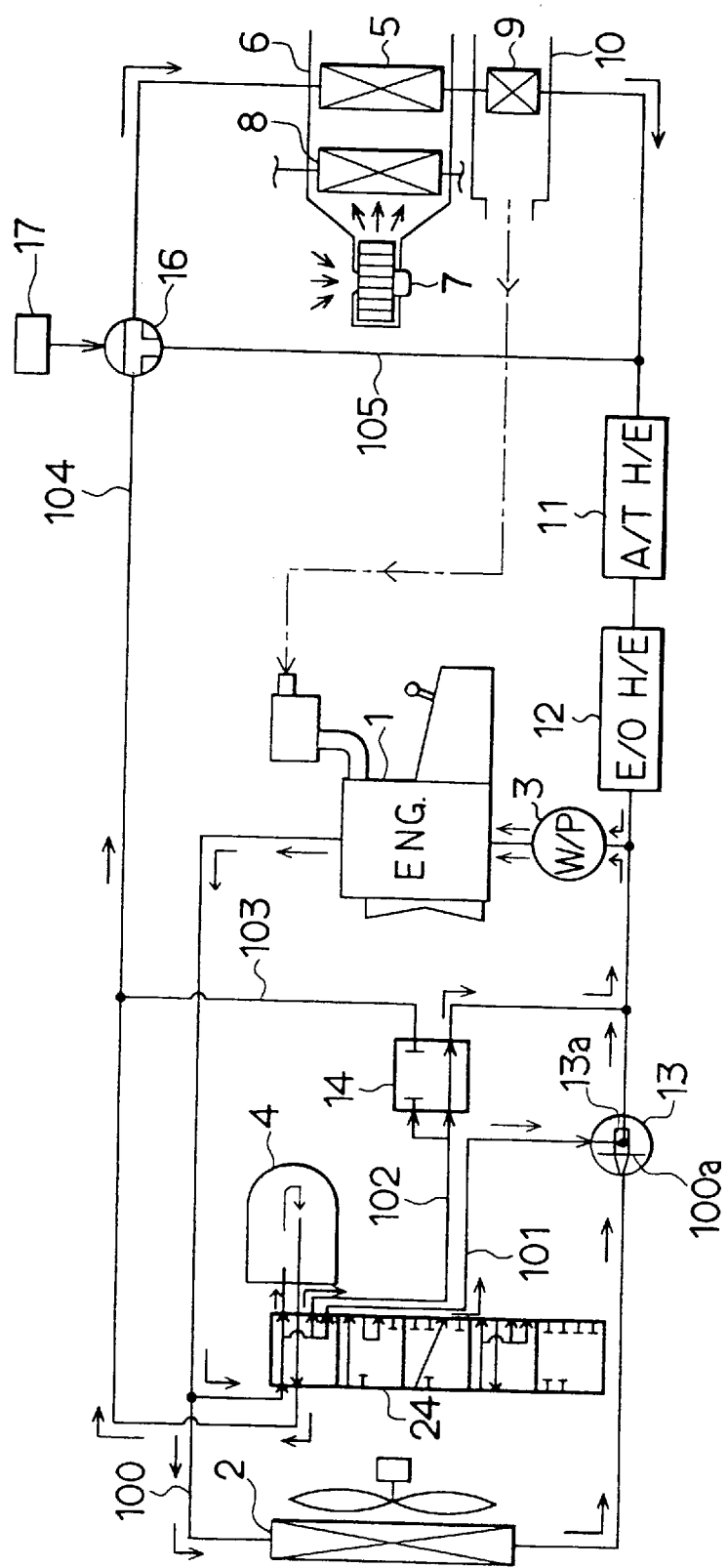
FIG. 12 a flow of cooling water in the cooling water circuit in a heat accumulating mode B in the first embodiment.
Figure 13:
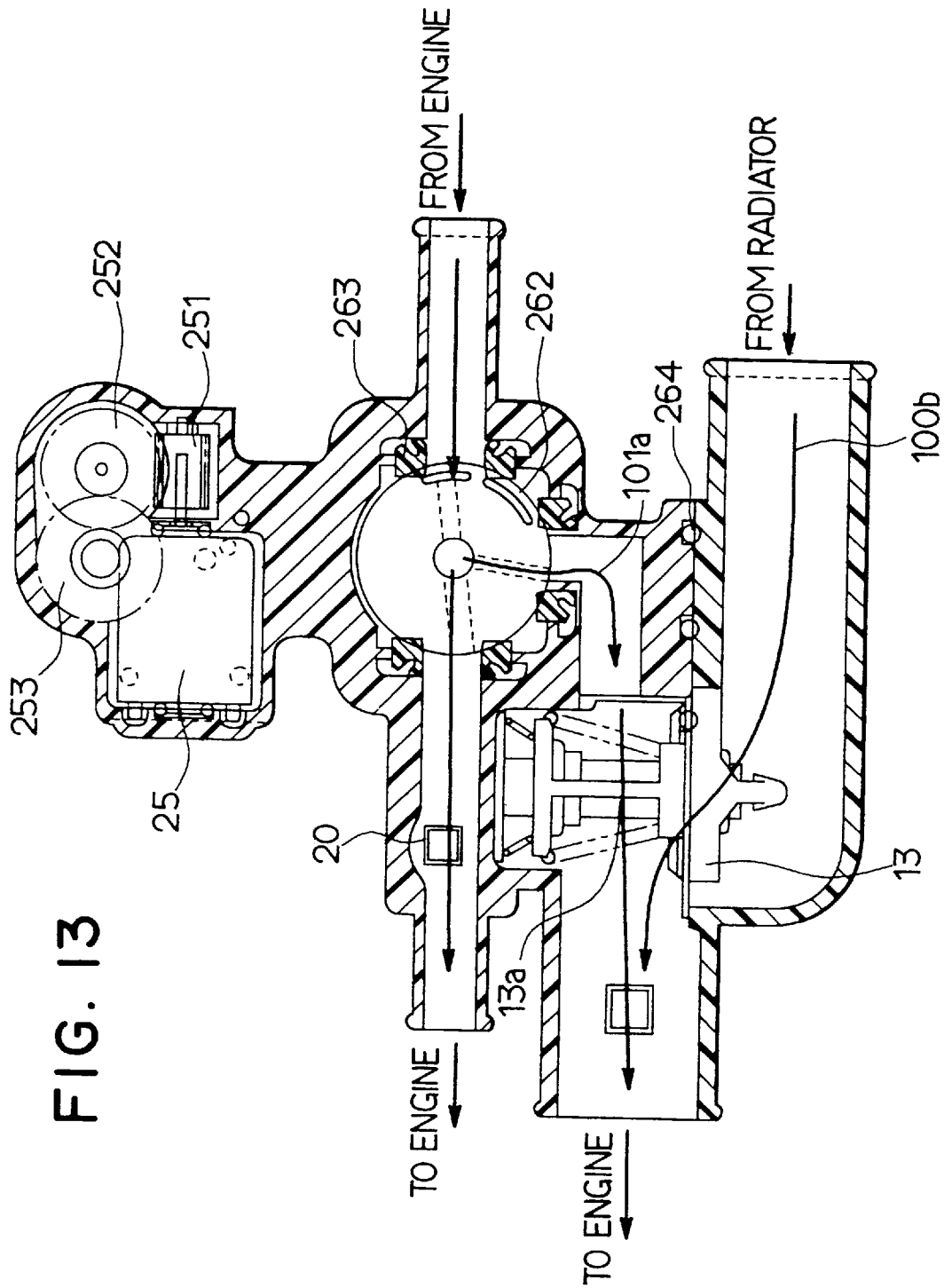
FIG. 13 is a cross sectional view, which corresponds to the cross section taken along IV—IV of FIG. 3, for showing the cooling water control valve in the heat accumulating mode B in the first embodiment.

During the cool water reserving mode, when the temperature $Tw_2$ of the cooling water having flowed out of the heat-accumulating tank 4 (the detection valve of the water temperature sensor 19) reaches the second predetermined temperature (in this embodiment, 80° C.), the heating operation is regarded as finished, and the opening passage 45 is opened. Further, when the absolute value of the intake negative pressure $P_{in}$ of the engine 1 is equal to or lower than 35 mmHg, the amount of the cooling water passing through the bypass water passage 101 (101a) is maximized (see FIGS. 12 and 13).

In this way, the cooling water having flowed out of the engine 1 passes through the bypass water passage 101, the heater core 5, and the heat-accumulating tank 4. Therefore, high-temperature cooling water is accumulated in the heat-accumulating tank 4. On the other hand, because a large amount of the cooling water passes through the bypass water passage 101, a temperature sensing operation of the temperature sensing portion 13a of the thermostat 13 becomes quick, and the temperature of the cooling water is maintained approximately at 80° C.

The bypass water passage 101 is opened only in the heat accumulating modes A and B. In each of the cooling water heat temperature maintaining mode, the engine warming-up accelerating mode (the quick heating mode), and the cool water reserving mode, the bypass water passage 101 is closed.

Figure 14:
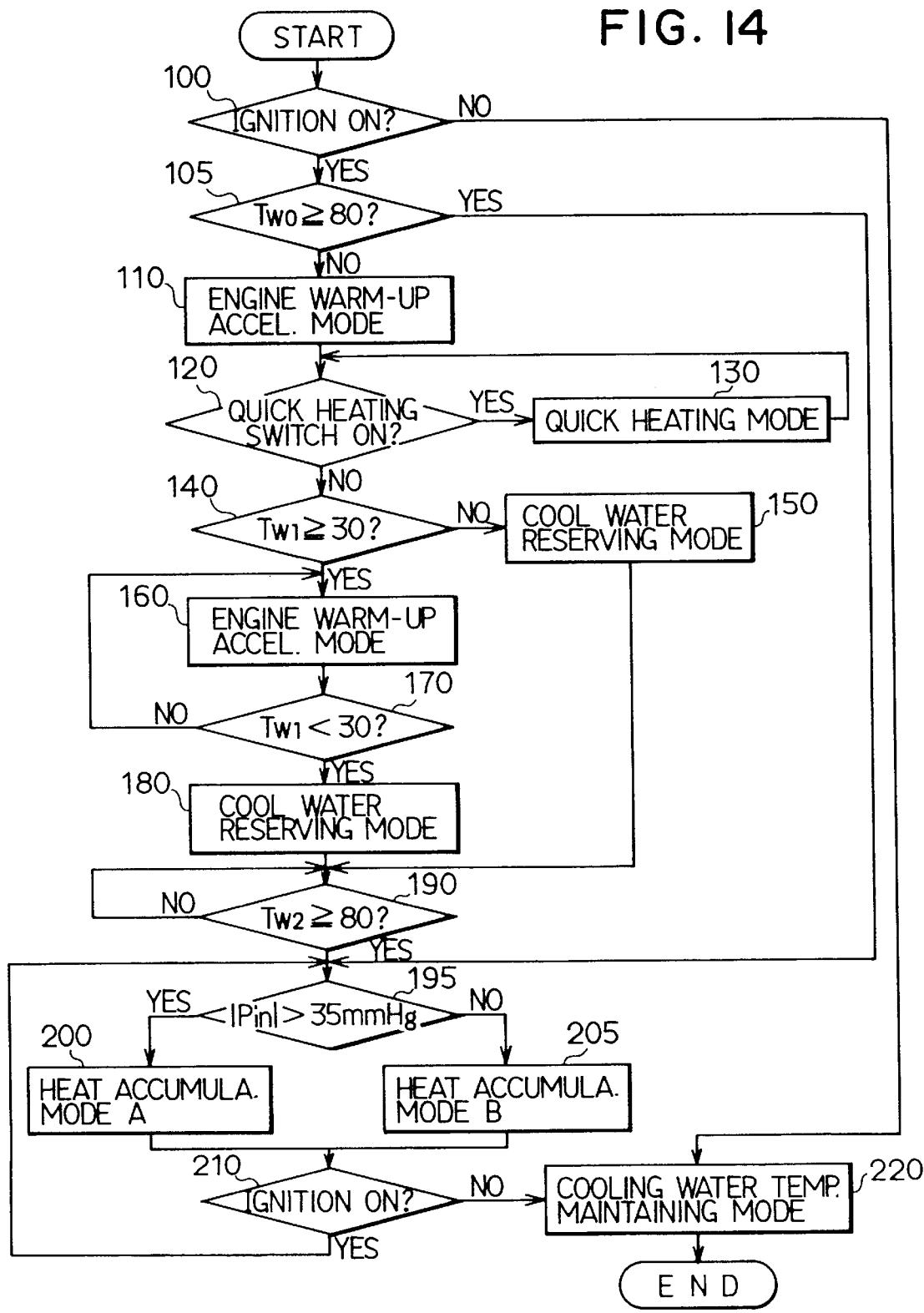
FIG. 14 is a flow chart showing an operation of the cooling water control valve according to each operation mode in the first embodiment.

FIG. 14 shows a flow chart showing an operation of the cooling water control valve 24 according to each operation mode. The operation of the cooling water control valve 24 will be described with reference to the flow chart.

It is determined whether or not the engine 1 is operating by the ignition switch 22 at step 100. When it is determined that the engine is operating, it is determined whether or not the temperature $Tw_0$ of the cooling water having flowed out of the engine 1, detected by the water temperature sensor 19a, is equal to or higher than 80° C. at step 105. On the other hand, when it is determined that the engine 1 stops, the cooling water control valve 24 is set to the cooling water temperature maintaining mode at step 220.

When it is determined that the temperature $Tw_0$ is equal to or higher than 80° C., the cooling water control valve 24 is set to the heat accumulating mode A at step 200. When it is determined that the temperature $Tw_0$ is lower than 80° C., the cooling water control valve 24 is set to the engine warming-up accelerating mode at step 110.

Next, it is determined whether or not the quick heating switch 23 is set on at step 120. When it is determined that the quick heating switch 23 is set on, the cooling water control valve 24 is set to the quick heating mode at step 130. On the other hand, when it is determined that the quick heating switch 23 is not set on, it is determined whether or not the temperature $Tw_1$ of the cooling water is equal to or higher than 30° C. When it is determined that the temperature $Tw_1$ of the cooling water is lower than 30° C., the cooling water control valve 24 is set to the cool water reserving mode at step 150. On the other hand, when it is determined that the temperature $Tw_1$ of the cooling water is equal to or higher than 30° C., the cooling water control valve 24 is maintained to the engine warming-up accelerating mode until the temperature $Tw_1$ of the cooling water becomes lower than 30° C. at steps 160 and 170.

When it is determined that the temperature $Tw_1$ of the cooling water is lower than 30° C., the cooling water control valve 24 is set to the cool water reserving mode until the temperature $Tw_2$ of the cooling water becomes higher than 80° C. at step 180. When the temperature $Tw_2$ of the cooling water becomes higher than 80° C., it is determined whether or not the absolute value of the intake negative pressure $P_{in}$ is larger than 35 mmHg at step 195. When it is determined that the absolute value of the intake negative pressure $P_{in}$ is larger than 35 mmHg, the cooling water control valve 24 is set to the heat-accumulating mode A at step 200. When it is determined that the absolute value of the intake negative pressure $P_{in}$ is smaller than 35 mmHg, the cooling water control valve 24 is set to the heat accumulating mode B at step 205.

Next, the cooling water control valve 24 is maintained to the heat accumulating mode A or B until the engine 1 is stopped at step 210. When the engine 1 stops, the cooling water control valve 24 is set to the cooling water temperature maintaining mode at step 220.

Because the threshold valve, 35 mmHg, for selecting the heat accumulating mode A or B, is an index for indicating a magnitude of the engine load, it is not limited to 35 mmHg but may be appropriately determined based on the volume of the exhaust gas, output characteristics of the engine 1, and the like.

Features of this embodiment will be described.

According to this embodiment, when the engine 1 is stopped, the opening passage 45 is closed. Therefore, the inside and the outside of the heat-accumulating tank 4 is interrupted, and the cooling water accumulated in the heat-accumulating tank 4 is reserved in the heat-accumulating tank 4. In this way, while the engine 1 stops, it is possible to prevent a convection between the cooling water in the other portions (e.g., the pipes connected to the heat-accumulating tank 4) than the heat-accumulating tank 4 and the cooling water in the heat-accumulating tank 4. Therefore, a mixture of the cooling water in the other portions than the heat-accumulating tank 4 and the cooling water in the heat-accumulating tank 4 can be prevented, so that the heat insulating capacity of the heat-accumulating tank 4 can be improved.

Further, since the control valve element 262 for closing the opening passage 45 is positioned adjacent to the opening passage 45, it is possible to certainly prevent the mixture of the cooling water in the other portions than the heat-accumulating tank 4 and the cooling water in the heat-accumulating tank 4. Therefore, the heat insulating capacity of the heat-accumulating tank 4 can be further improved.

In the engine warming-up accelerating mode, when the engine 1 starts, the low-temperature cooling water staying in the engine 1 flows into the heat-accumulating tank 4, and the high-temperature cooling water accumulated in the heat-accumulating tank 4 flows into the engine 1. However, if all of the high-temperature cooling water accumulated in the heat-accumulating tank 4 flows out, the low-temperature cooling water flowed out of the engine 1 immediately after the engine 1 starts may circulate into the engine 1, and the temperature of the cooling water in the engine 1 lowers, with the result that the warming-up operation may be delayed.

In contrast, according to this embodiment, since the cooling water having flowed out of the heat-accumulating tank 4 circulates directly into the engine 1 to bypass the heat-accumulating tank 4 when the temperature $Tw_1$ of the cooling water having flowed out of the heat-accumulating tank 4 becomes lower than the first predetermined value, the low-temperature cooling water discharged from the engine 1 immediately after the engine 1 is stopped is reserved in the heat-accumulating tank 4 to prevent the low-temperature cooling water from circulating into the engine 1.

Therefore, since the warming-up operation can be prevented from being delayed, it is possible to reduce an amount of harmful material (exhaust gas emission) to be released to the atmosphere during the warming-up operation and also to improve the fuel consumption.

Further, since the bypass water passage 101 is closed in the engine warming-up accelerating mode, it is possible to prevent the low-temperature cooling water discharged out of the engine 1 immediately after the engine 1 is stopped from circulating into the engine 1. Therefore, it is possible to accelerate the warming-up operation of the engine 1 sufficiently by the high-temperature cooling water accumulated in the heat-accumulating tank 4.

Further, since the opening and closing of the opening passage 45, each of the cooling water passage 100b, 106 and 107, and the flow amount adjustment of the bypass passage 101a are performed by single control valve element 262, the flow control valve mechanism and the switching valve mechanism can be obtained by single valve element.

Therefore, as compared with when the flow control valve mechanism and the switching valve mechanism are constructed by independent valve means, the number of parts can be reduced so that the apparatus can be downsized. Further, it is possible to improve the mounting (assembling) performance of the cooling water circuit for improving the fuel consumption on the vehicle.

Further, the bypass water passage 101 is closed during the warming-up operation of the engine 1 by closing the bypass water passage 101 in the engine warming-up accelerating mode (quick heating mode) and the cool water reserving mode. Therefore, as being different from the apparatus in which the amount of the cooling water passing through the bypass water passage 101 is mechanically controlled by the intake negative pressure when the load applied to the engine 1 is increased during the warming-up operation of the engine 1 (the absolute value of the intake negative pressure $P_{in}$ is decreased), it is possible to prevent a large amount of the low-temperature cooling water discharged out of the engine 1 from passing through the bypass water passage 101 and further circulating into the engine 1. In this way, it is possible to further accelerate the warming-up operation of the engine 1.

A second embodiment of the present invention will be described with reference to FIGS. 15 to 26.

Figure 15:
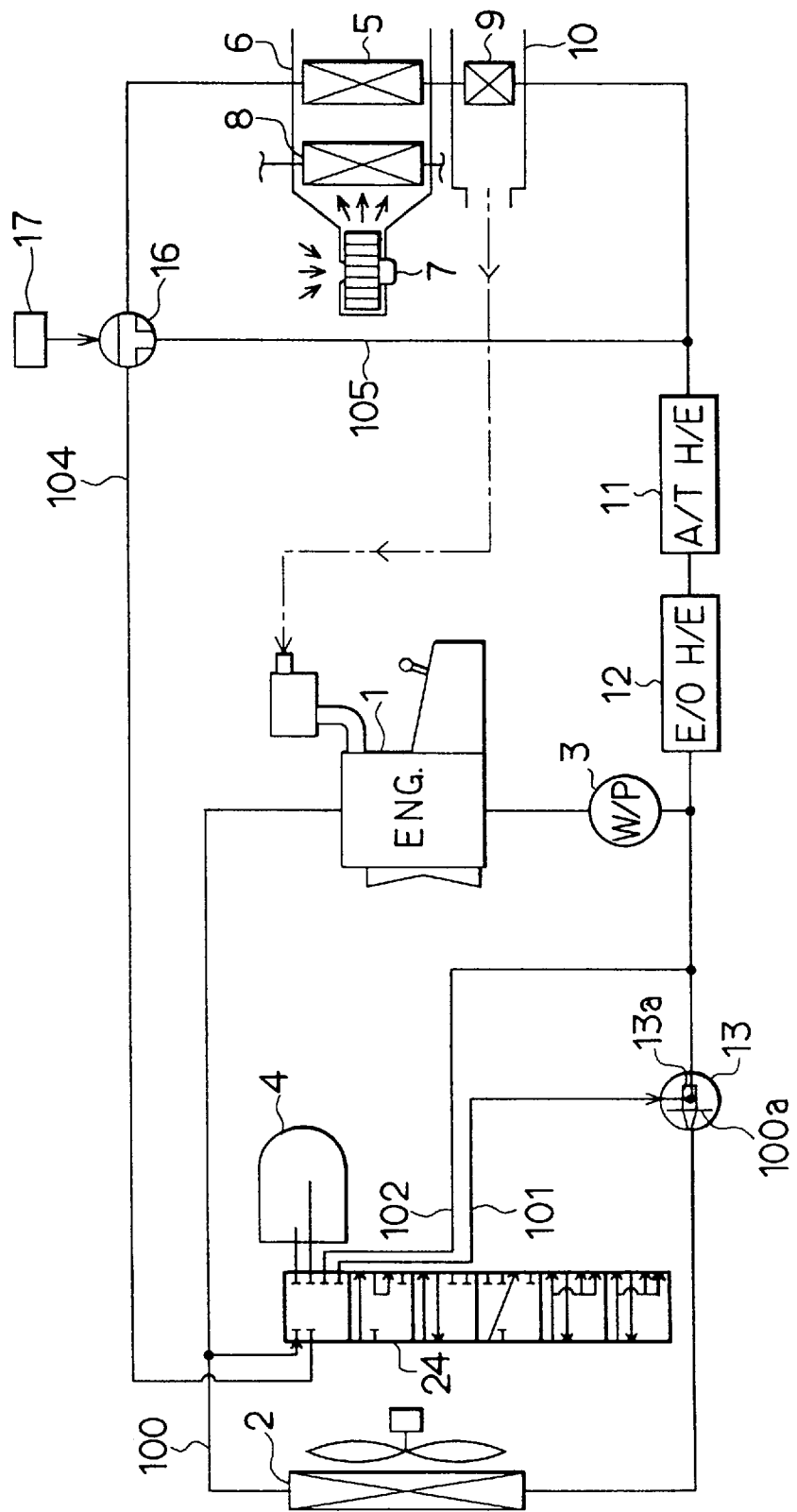
FIG. 15 shows a flow of cooling water in the cooling water circuit in a cooling water temperature maintaining mode according to a second embodiment of the present invention.

In this embodiment, as shown in FIG. 15, the cooling water switching function of the switching valve 14 is incorporated in the cooling water control valve 24.

Figure 16:
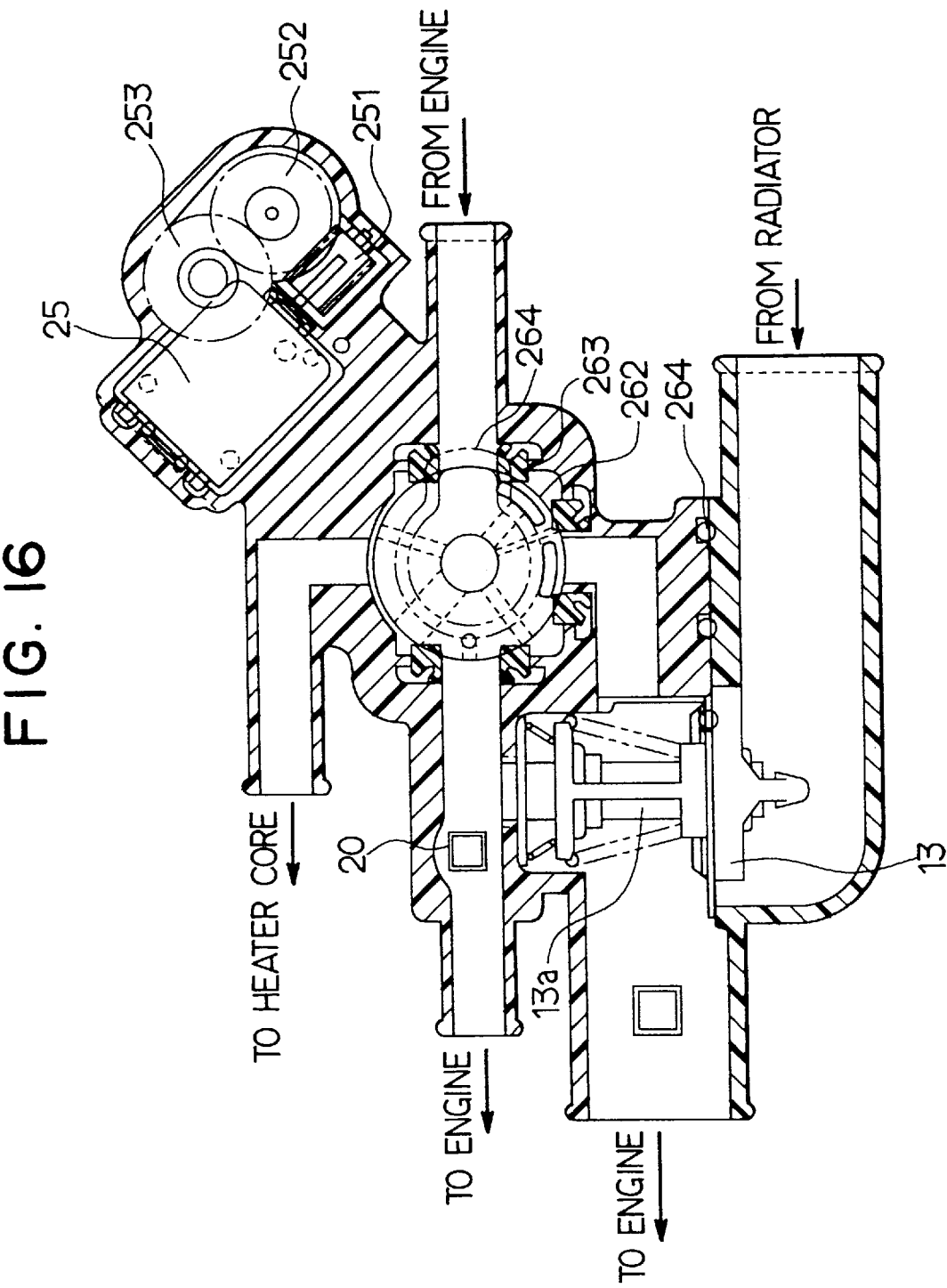
FIG. 16 is a cross sectional view, which corresponds to the cross section taken along IV—IV of FIG. 3, for showing the cooling water control valve in the cooling water temperature maintaining mode in the second embodiment.
Figure 17:
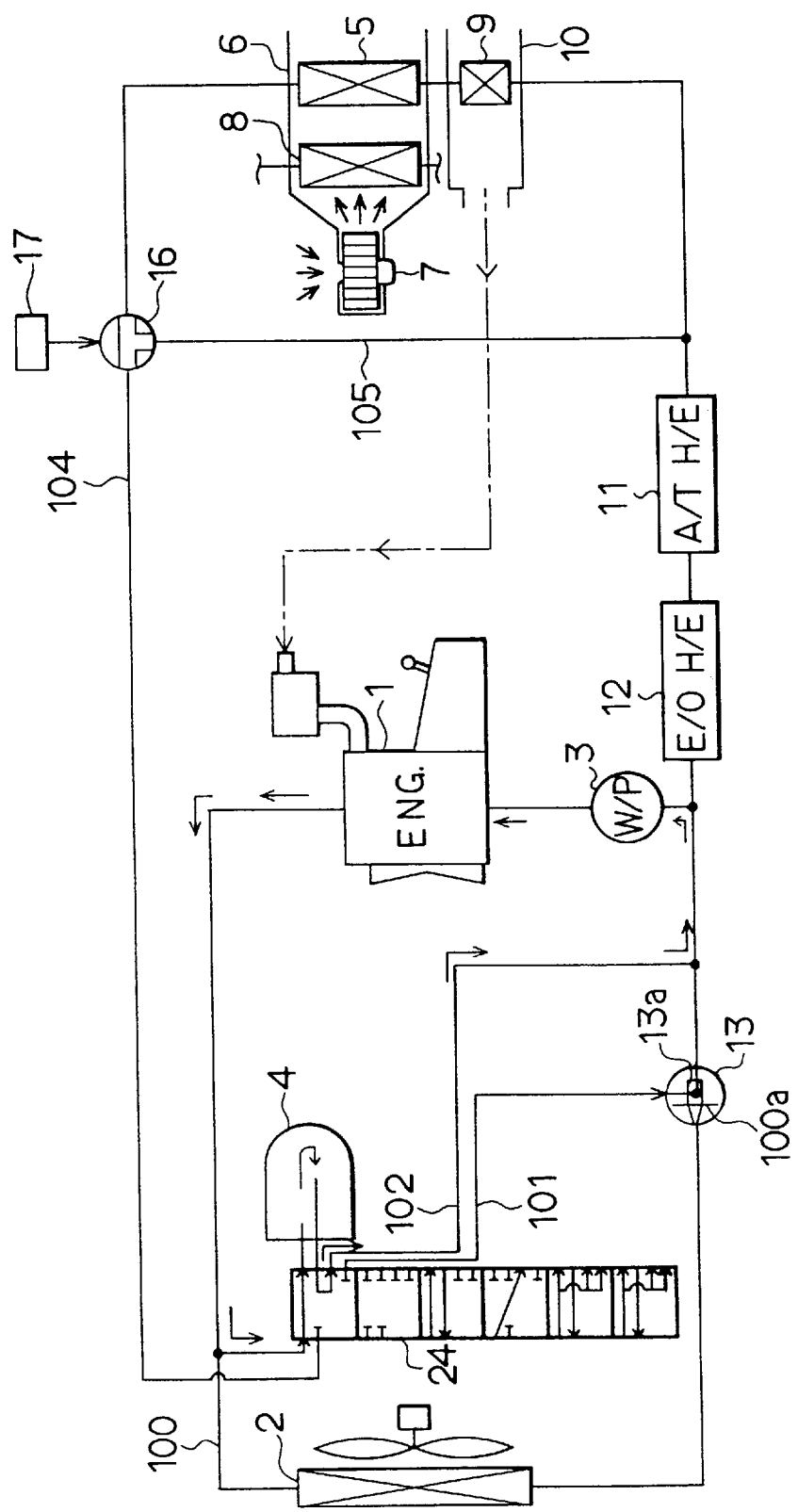
FIG. 17 shows a flow of cooling water in the cooling water circuit in an engine warming-up accelerating mode in the second embodiment.
Figure 18:
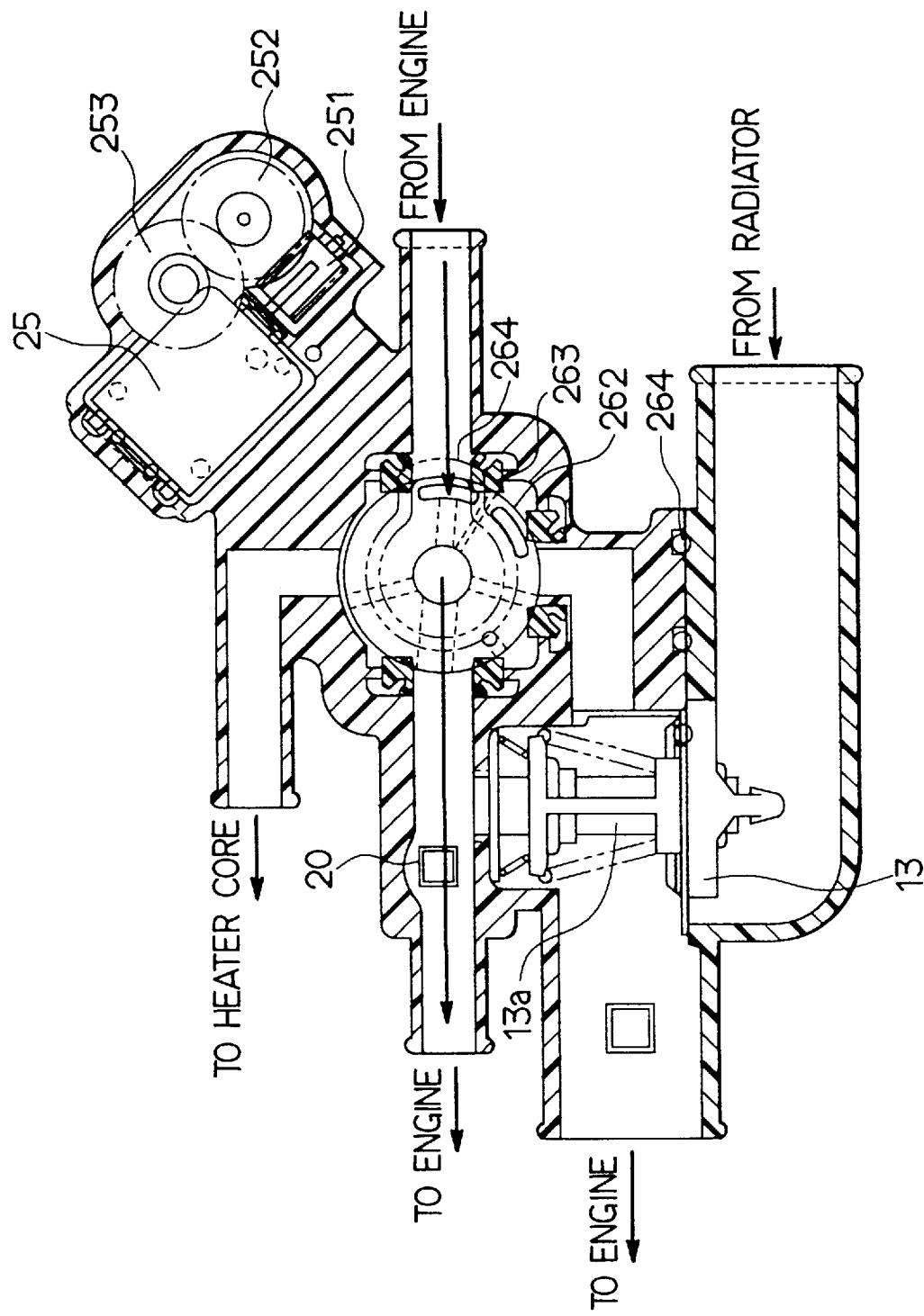
FIG. 18 is a cross sectional view, which corresponds to the cross section taken along IV—IV of FIG. 3, for showing the cooling water control valve in the engine warming-up accelerating mode in the second embodiment.
Figure 19:
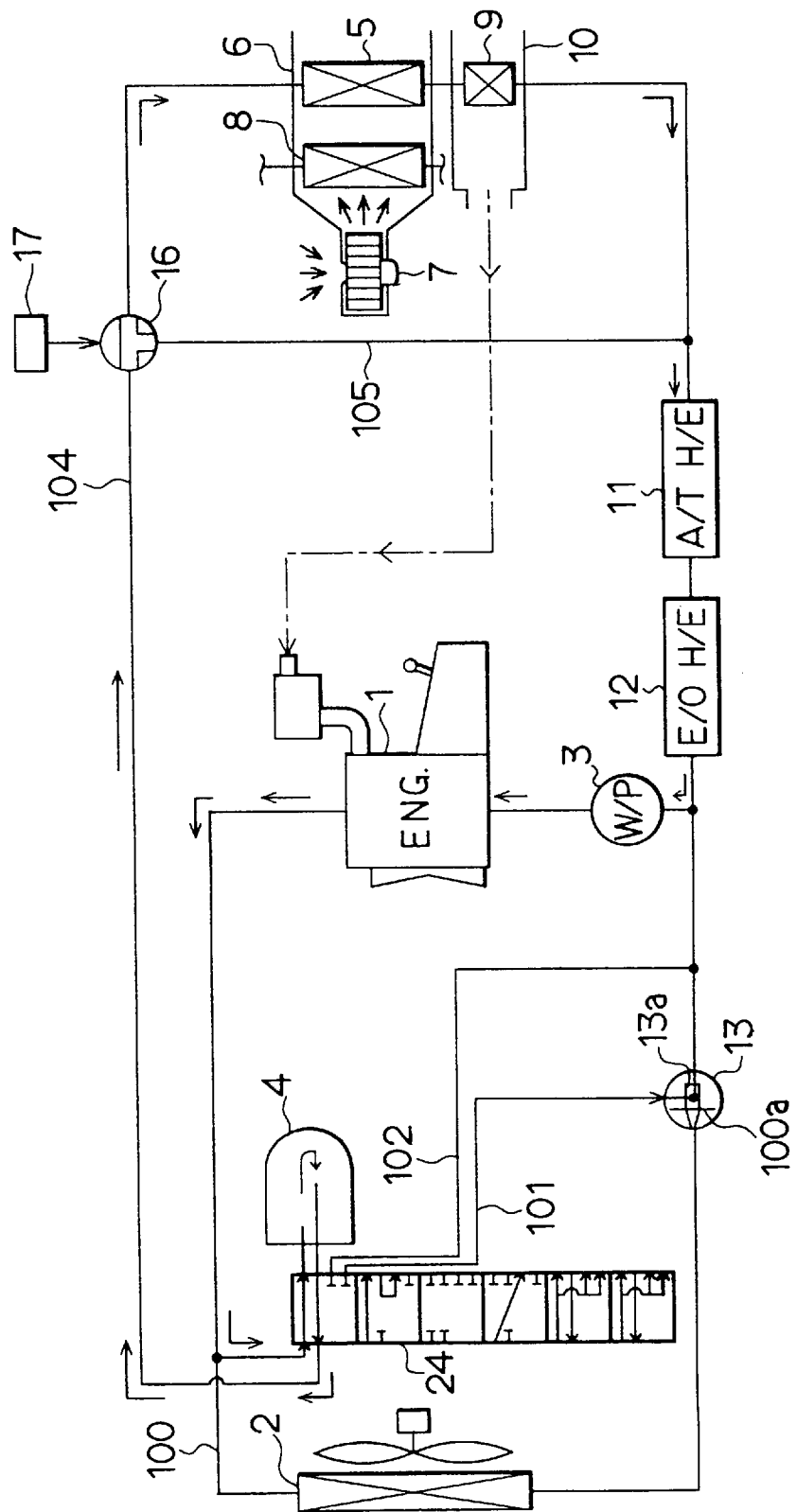
FIG. 19 shows a flow of cooling water in the cooling water circuit in a quick heating mode in the second embodiment.
Figure 20:
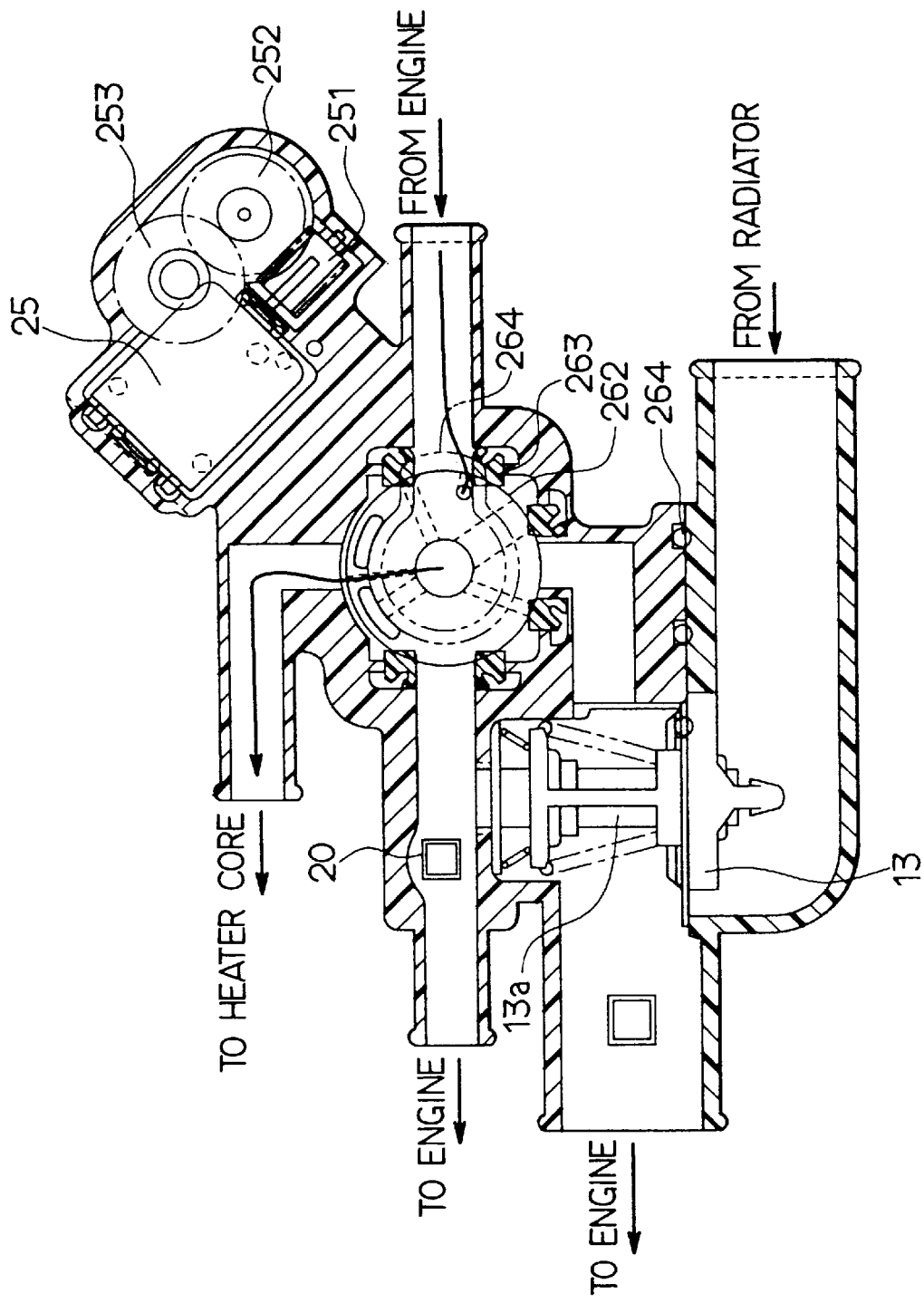
FIG. 20 is a cross sectional view, which corresponds to the cross section taken along IV—IV of FIG. 3, for showing the cooling water control valve in the quick heating mode in the second embodiment.
Figure 21:
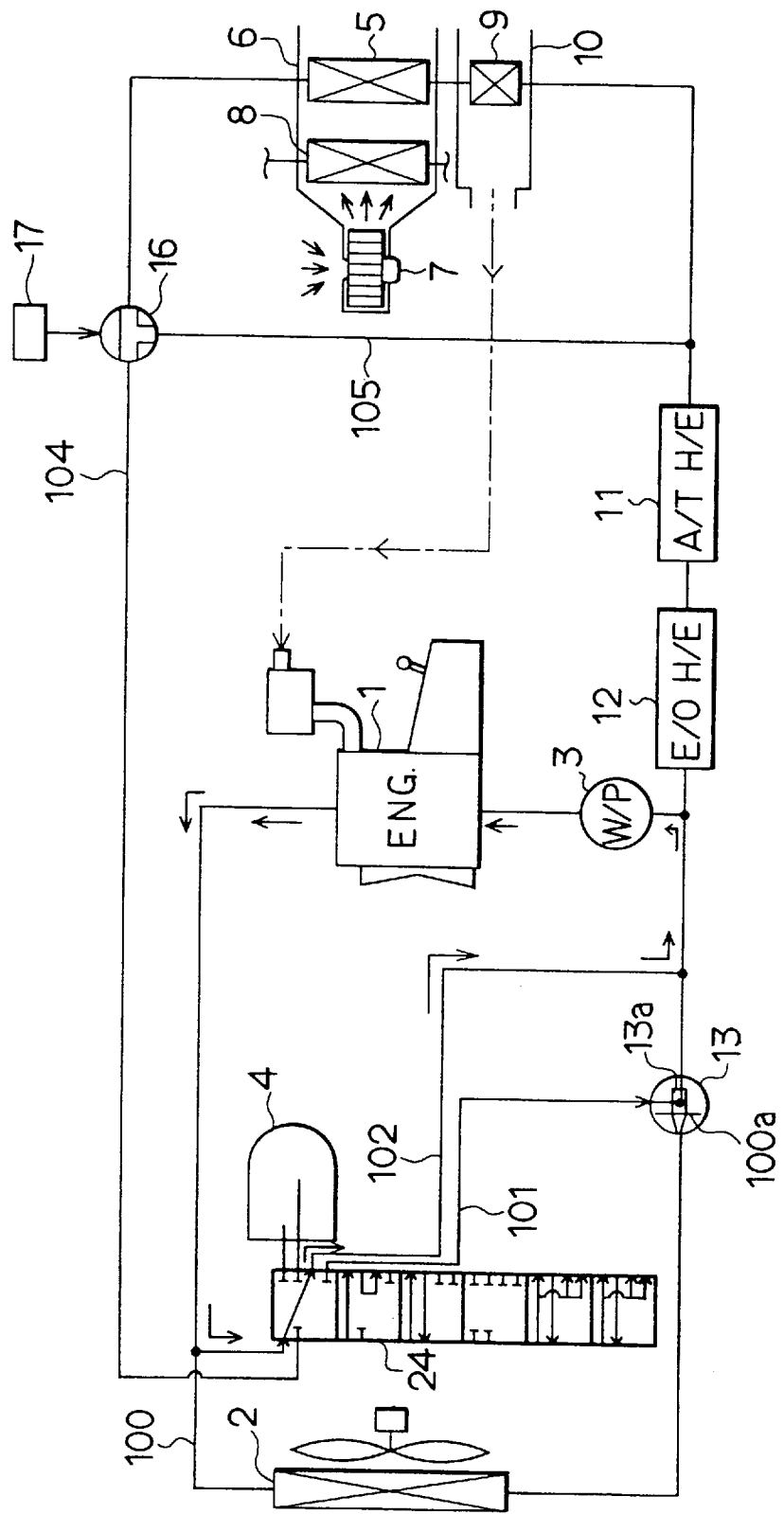
FIG. 21 shows a flow of cooling water in the cooling water circuit in the cool water reserving mode in the second embodiment.
Figure 22:
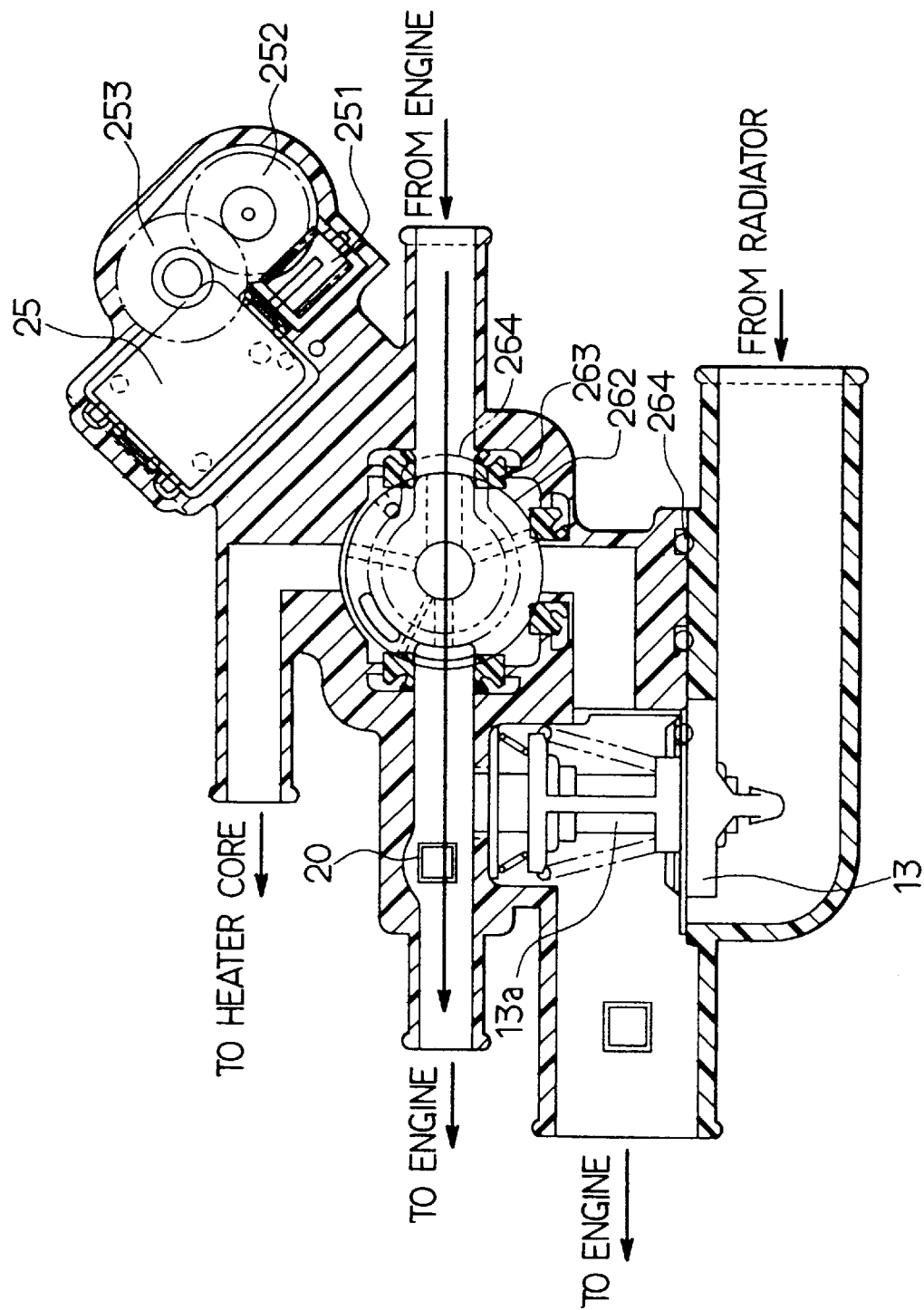
FIG. 22 is a cross sectional view, which corresponds to the cross section taken along IV—IV of FIG. 3, for showing the cooling water control valve in the cool water reserving mode in the second embodiment.
Figure 23:
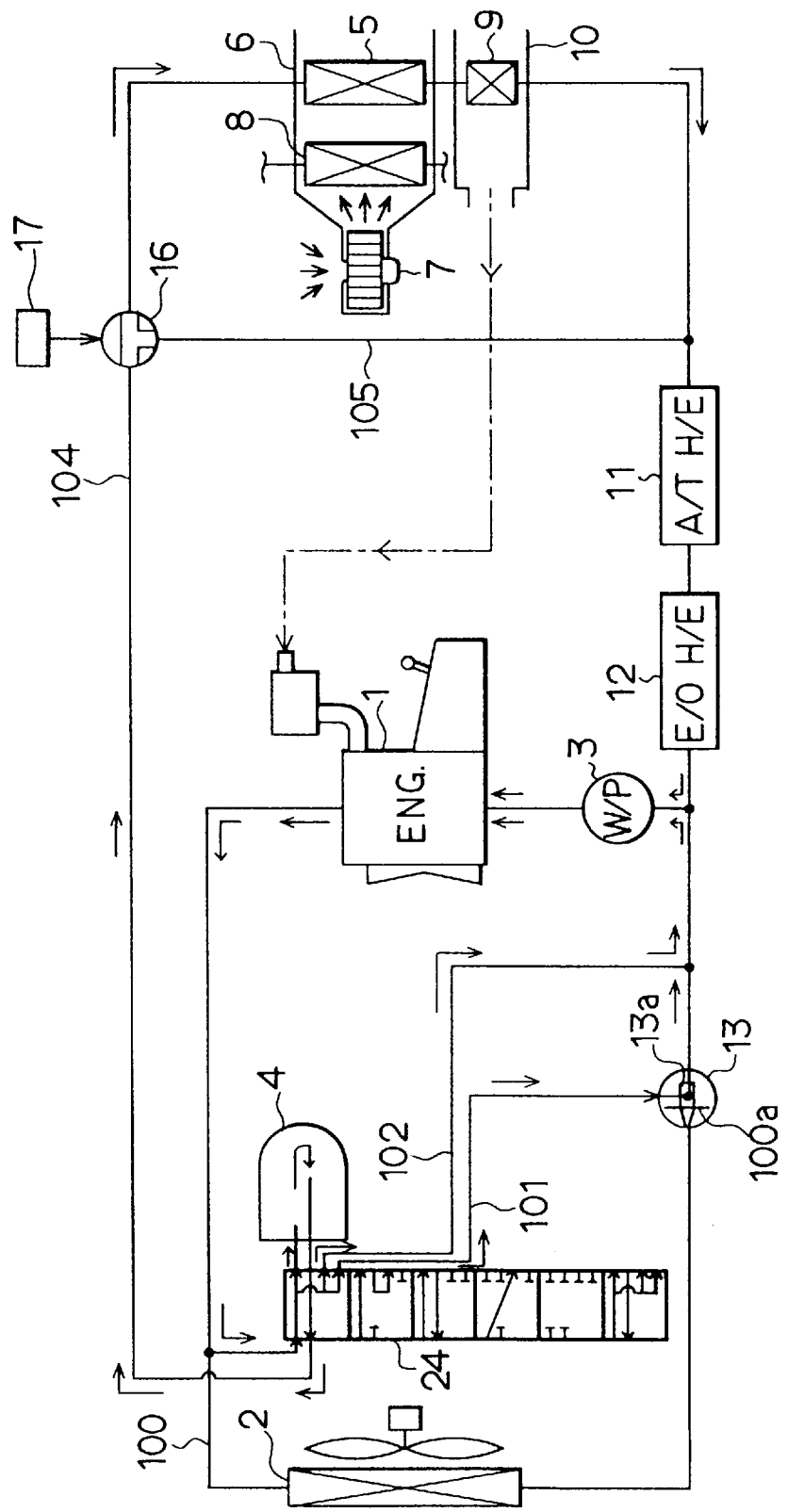
FIG. 23 shows a flow of cooling water in the cooling water circuit in a heat accumulating mode A in the second embodiment.
Figure 24:
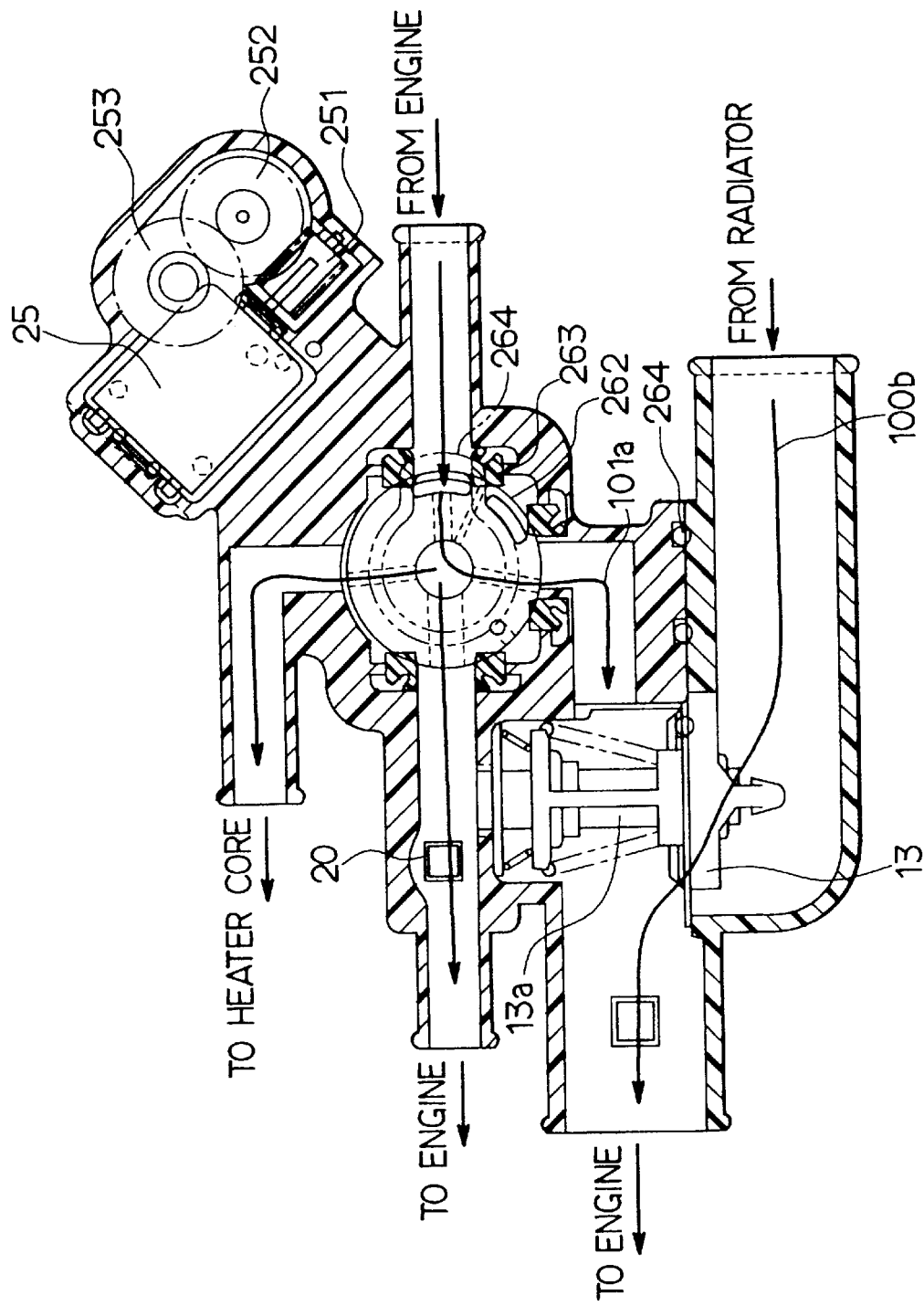
FIG. 24 is a cross sectional view, which corresponds to the cross section taken along IV—IV of FIG. 3, for showing the cooling water control valve in the heat accumulating mode A in the second embodiment.
Figure 25:
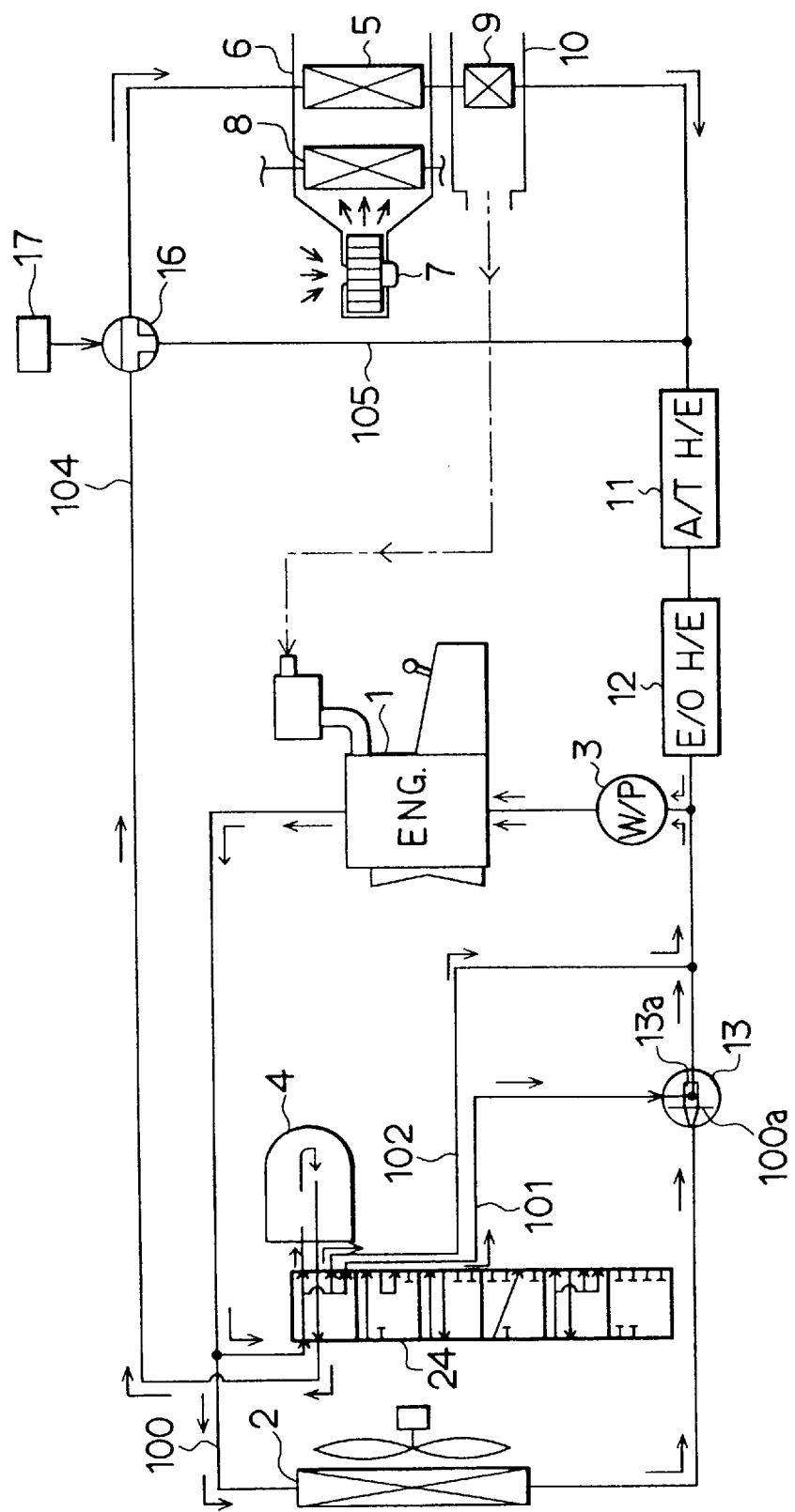
FIG. 25 shows a flow of cooling water in the cooling water circuit in a heat accumulating mode B in the second embodiment.
Figure 26:
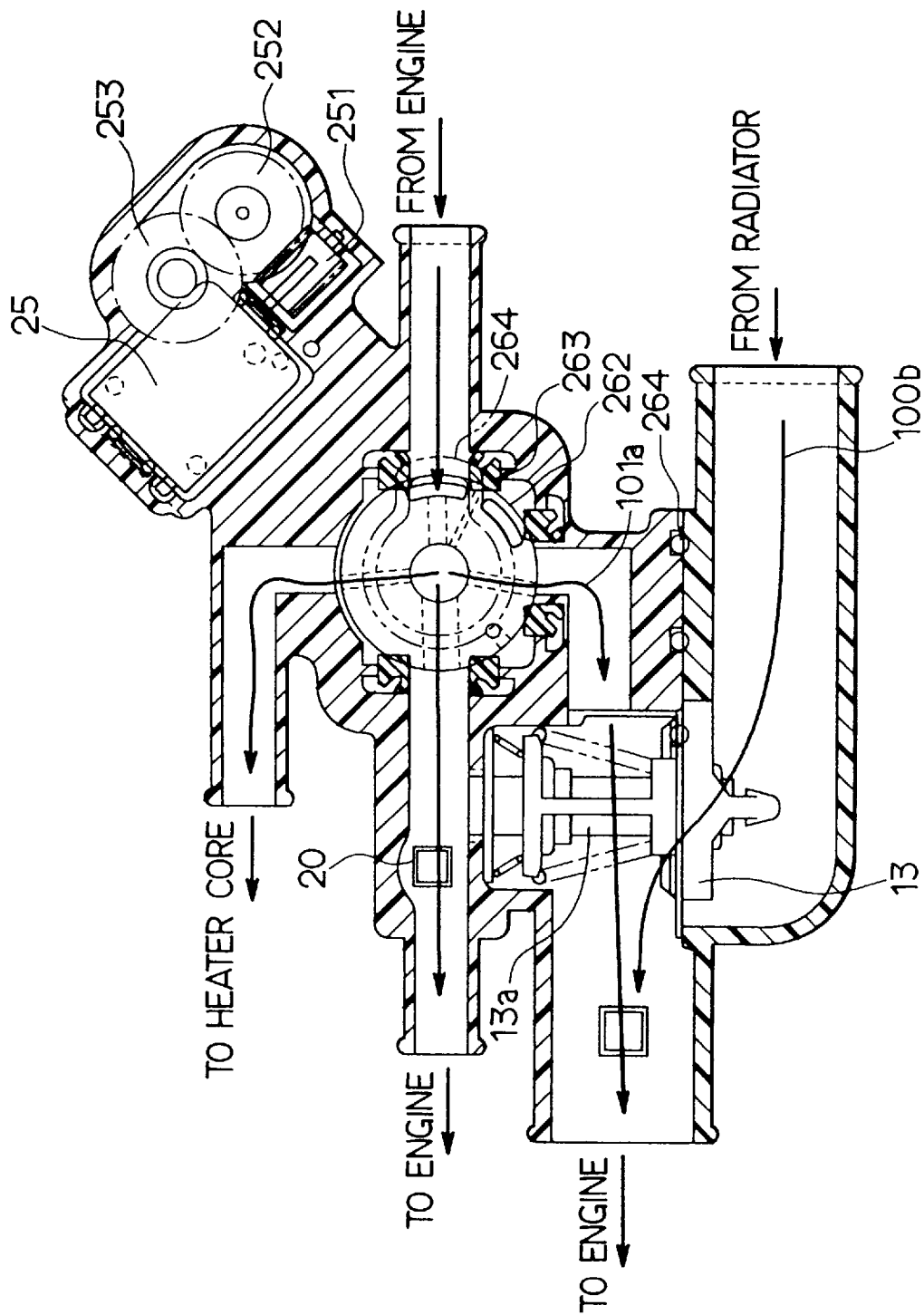
FIG. 26 is a cross sectional view, which corresponds to the cross section taken along IV—IV of FIG. 3, for showing the cooling water control valve in the heat accumulating mode B in the second embodiment.

More specifically, as shown in FIG. 16, a quick heating water passage 104a for introducing the high-temperature cooling water in the heat-accumulating tank 4 directly into the heater water passage 104 in the quick heating mode is formed in the housing 261, and the quick heating water passage 104a is opened and closed by the control valve element 262. FIGS. 15 and 16 show a flow of the cooling water and a state of the control valve element 262 in the cooling water temperature maintaining mode, respectively. FIGS. 17 and 18 show a flow of the cooling water and a state of the control valve element 262 in the engine warming-up accelerating mode, respectively. FIGS. 19 and 20 show a flow of the cooling water and a state of the control valve element 262 in the quick heating mode, respectively. FIGS. 21 and 22 show a flow of the cooling water and a state of the control valve element 262 in the cool water reserving mode, respectively. FIGS. 23 and 24 show a flow of the cooling water and a state of the control valve element 262 in the heat accumulating mode A, respectively. FIGS. 25 and 26 show a flow of the cooling water and a state of the control valve element 262 in the heat accumulating mode B, respectively.

In each of the above-described embodiments, the heat of the cooling water is accumulated by reserving the high-temperature cooling water in the heat-accumulating tank 4; however, there may be employed a heat-accumulating tank made of latent-heat heat-accumulating material such as $CH_3COONa$, $Ba(OH)_2$—$8H_2O$.

Further, in each of the above-described embodiments, the present invention is applied to a re-heat type air conditioning apparatus for a vehicle; however, the present invention may be employed to an air-mixing type air conditioning apparatus in which a temperature of the air to be blown into the passenger compartment is adjusted by adjusting a ratio between an amount of the air passing through the heater core 5 and an amount of the air bypassing the heater core 5.

In each of the above-described embodiments, a predetermined intake negative pressure $P_{in}$ (−35 mmHg) is employed as the threshold value to control the amount of the cooling water passing through the bypass water passage 101(101a) into two steps; however, the amount of the cooling water passing through the bypass water passage 101(101a) may be controlled into multi-steps or continuously according to the intake negative pressure $P_{in}$.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A cooling water control valve for controlling cooling water flowing in a cooling water circuit having a water-cooled engine, a radiator for radiating heat of the cooling water discharged from said engine, and a heat-accumulating tank for accumulating heat while receiving the cooling water discharged from said engine therein, said cooling water control valve comprising:

a housing having a radiator water passage, one end of which is connected to said radiator and the other end of which is connected to said engine, and a temperature sensing water passage for introducing the cooling water having flowed into said housing;

a temperature sensing operation valve disposed in said radiator water passage and having a temperature sensing portion for sensing a temperature of the cooling water flowing into said housing and further introduced thereto through said temperature sensing water passage, said temperature sensing operation valve opening and closing said radiator water passage in accordance with the temperature of the cooling water, detected by said temperature sensing portion;

a single control valve element for controlling an amount of the cooling water passing through said temperature sensing water passage and a flow of the cooling water flowing out of and into said heat-accumulating tank;

a negative pressure detector for detecting an intake negative pressure of said engine;

a control unit for controlling an operation of said control valve element such that:

an amount of the cooling water passing through said temperature sensing water passage is increased according to a decrease of the absolute value of said intake negative pressure detected by said negative pressure detector, and an amount of the cooling water passing through said temperature sensing water passage is decreased according to a increase of the absolute value of said intake negative pressure detected by said negative pressure detector.

2. A cooling water control valve according to claim 1, wherein, said temperature sensing water passage is connected to a cooling water inflow side of said engine, and said control unit controls said control valve element to close said temperature sensing water passage during a warming-up operation of said engine.

3. A cooling water control valve according to claim 1, further comprising:

a first water temperature sensor for detecting a temperature of the cooling water having just flowed out of said engine, wherein, when the temperature of the cooling water having just flowed out of said engine, detected by said first water temperature sensor, is lower than a predetermined value, said control unit controls said control valve element such that:

the cooling water having flowed out of said engine is introduced into said heat-accumulating tank, and the cooling water accumulated in said heat-accumulating tank is introduced into said engine.

4. A cooling water control valve according to claim 3, further comprising:

a second water temperature sensor for detecting a temperature of the cooling water having flowed out of said heat-accumulating tank, wherein, when the temperature of the cooling water having flowed out of said heat-accumulating tank, detected by said second water temperature sensor, is lower than a predetermined value, said control unit controls said control valve element such that:

said temperature sensing water passage is closed, and the cooling water accumulated in said heat-accumulating tank is reserved.

5. A cooling water control valve according to claim 1, wherein said control unit controls said control valve element to control the amount of the cooling water passing through said temperature sensing water passage into two steps according to a variation of the intake negative pressure.

6. A cooling water control valve according to claim 1, wherein said control unit controls said control valve element to maximize the amount of the cooling water passing through said temperature sensing water passage into when the intake negative pressure is less than a predetermined value.

7. A cooling water control valve according to claim 1, wherein said control unit controls said control valve element to reserve the cooling water in said heat-accumulating tank while said engine is stopped.

8. A cooling water control valve according to claim 1, wherein said negative pressure detector electrically detects the intake negative pressure of said engine.

9. A cooling water circuit system for a water-cooled engine, comprising:

means for forming a cooling water circuit in which said engine is disposed;

a pump disposed in said cooling water circuit, for pumping cooling water in said cooling water circuit;

a radiator disposed in said cooling water circuit, for radiating heat of the cooling water discharged from said engine;

a heat-accumulating tank for accumulating heat while receiving the cooling water discharged from said engine therein;

a cooling water control valve disposed in said cooling water circuit between said engine and said radiator, for controlling cooling water flowing in said cooling water circuit; and a negative pressure detector for detecting an intake negative pressure of said engine; wherein, said cooling water control valve includes:

a housing having a radiator water passage, one end of which is connected to said radiator and the other end of which is connected to said engine, and a temperature sensing water passage for introducing the cooling water having flowed in said housing;

a temperature sensing operation valve disposed in said radiator water passage and having a temperature sensing portion for sensing a temperature of the cooling water flowing into said housing and further introduced thereto through said temperature sensing water passage, said temperature sensing operation valve opening and closing said radiator water passage in accordance with the temperature of the cooling water, detected by said temperature sensing portion;

a single control valve element for controlling an amount of the cooling water passing through said temperature sensing water passage and a flow of the cooling water flowing out of and into said heat-accumulating tank;

a control unit for controlling an operation of said control valve element such that:

an amount of the cooling water passing through said temperature sensing water passage is increased according to a decrease of the absolute value of said intake negative pressure detected by said negative pressure detector, and an amount of the cooling water passing through said temperature sensing water passage is decreased according to a increase of the absolute value of said intake negative pressure detected by said negative pressure detector.

10. A cooling water circuit system according to claim 9, wherein, said temperature sensing water passage is connected to a cooling water inflow side of said engine, and said control unit controls said control valve element to close said temperature sensing water passage during a warming-up operation of said engine.

11. A cooling water circuit system according to claim 9, further comprising:

a first water temperature sensor for detecting a temperature of the cooling water having just flowed out of said engine, wherein, when the temperature of the cooling water having just flowed out of said engine, detected by said first water temperature sensor, is lower than a predetermined value, said control unit controls said control valve element such that:

the cooling water having flowed out of said engine is introduced into said heat-accumulating tank, and the cooling water accumulated in said heat-accumulating tank is introduced into said engine.

12. A cooling water circuit system according to claim 11, further comprising:

a second water temperature sensor for detecting a temperature of the cooling water having flowed out of said heat-accumulating tank, wherein, when the temperature of the cooling water having flowed out of said heat-accumulating tank, detected by said second water temperature sensor, is lower than a predetermined value, said control unit controls said control valve element such that:

said temperature sensing water passage is closed, and the cooling water accumulated in said heat-accumulating tank is reserved.

13. A cooling water circuit system according to claim 9, wherein said control unit controls said control valve element to control the amount of the cooling water passing through said temperature sensing water passage into two steps according to a variation of the intake negative pressure.

14. A cooling water circuit system according to claim 9, wherein said control unit controls said control valve element to maximize the amount of the cooling water passing through said temperature sensing water passage when the intake negative pressure is less than a predetermined value.

15. A cooling water circuit system according to claim 9, wherein said control unit controls said control valve element to reserve the cooling water in said heat-accumulating tank while said engine is stopped.

16. A cooling water circuit system according to claim 9, wherein said negative pressure detector electrically detects the intake negative pressure of said engine.

17. A cooling water circuit system according to claim 9, further comprising:

a heating heat exchanger disposed in said cooling water circuit, for heating air by using heat of the cooling water.

* * * * *